United States Patent

Yamamoto et al.

[11] Patent Number: 6,131,297
[45] Date of Patent: Oct. 17, 2000

[54] GYRO COMPASS

[75] Inventors: Kanshi Yamamoto; Shin-ichi Kawada; Takeshi Hojo, all of Kuroiso; Michio Fukano, Ohtawara, all of Japan

[73] Assignee: Tokimec, Inc., Tokyo, Japan

[21] Appl. No.: 09/228,026

[22] Filed: Jan. 9, 1999

[30] Foreign Application Priority Data

Jan. 12, 1998 [JP] Japan ................................. 10-004179
Mar. 17, 1998 [JP] Japan ................................. 10-067010

[51] Int. Cl.$^7$ ........................................... G01C 19/34
[52] U.S. Cl. ................................... 33/326; 33/324
[58] Field of Search ........................... 33/316, 317 R, 33/317 D, 318, 319, 324, 325, 326, 327

[56] References Cited

U.S. PATENT DOCUMENTS

| | | | |
|---|---|---|---|
| 3,855,711 | 12/1974 | Kawada et al. | 33/327 |
| 4,458,426 | 7/1984 | O'Connor et al. | 33/326 |
| 4,791,727 | 12/1988 | Hojo et al. | 33/325 |
| 5,056,052 | 10/1991 | Wick et al. | 364/572 |
| 5,247,748 | 9/1993 | Hojo et al. | 33/324 |
| 5,416,976 | 5/1995 | Hane et al. | 33/326 |

FOREIGN PATENT DOCUMENTS

| | | | |
|---|---|---|---|
| 2100428 | 12/1982 | United Kingdom | 19/38 |
| 2253483 | 9/1992 | United Kingdom | 19/38 |

*Primary Examiner*—G. Bradley Bennett
*Attorney, Agent, or Firm*—Bauer & Schaffer, LLP

[57] ABSTRACT

To provide a gyro compass for the use of a high speed ship, in a gyro compass of the type having north-seeking means which is applied to support a gyro sphere or gyro case immersed in a liquid in a tank, a substantially first-order lag filter is provided in an azimuth follow-up loop or a damping loop, the substantially first-order lag filter having a time constant $T_F$ which is approximately equal to a ratio $C/k_T$ of the viscosity torque coefficient C to the twisting torque coefficient $k_T$ of the torque produced between the tank and the gyro case. A speed error correcting means has a substantially first-order lag filter having a time constant which is approximately equal to that of the north-seeking means, and is applied to correct the output of azimuth indicator by a speed error correcting angle through the substantially first-order lag filter.

7 Claims, 12 Drawing Sheets

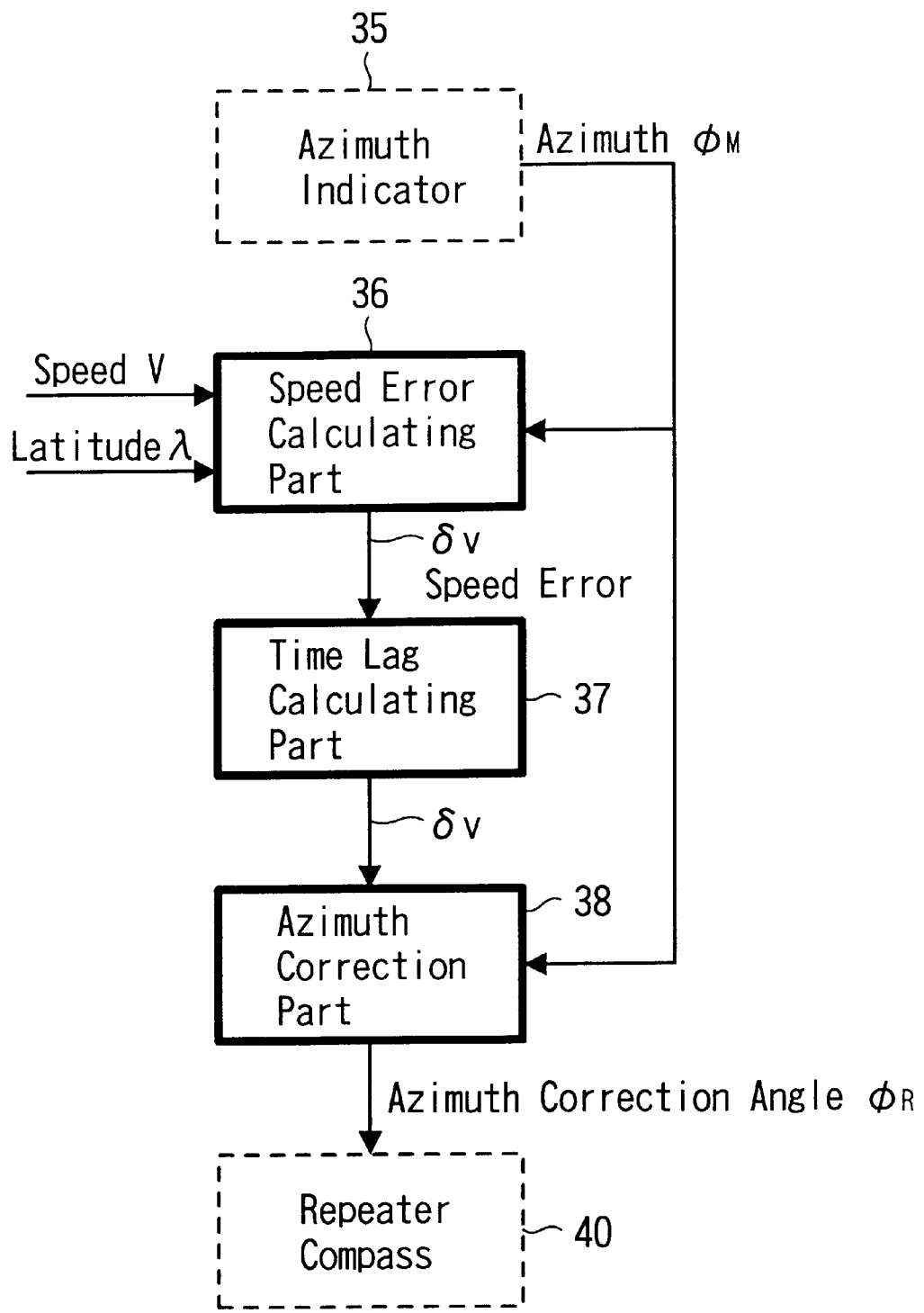
F I G. 12

GYRO COMPASS

BACKGROUND OF THE INVENTION

FIELD OF THE INVENTION

The present invention relates to a gyro compass which requires a high accuracy for the use of a ship or the like, particularly, a gyro compass for the use of a ship which can run at a high speed.

An example of prior art gyro compasses is disclosed in the Japan Patent NO. 885730 (Patent Publication Showa 52-10017) which is owned by the same assignee as the applicant of the present application. This gyro compass will be described hereinafter, however, in detail, please refer to the Japan Patent NO. 885730.

As shown in FIG. 1, the gyro compass has a gyro rotor (indicated by a dotted line) rotating at a high speed, a gyro sphere or gyro case 1 having a hermetic structure and for accommodating the gyro rotor therein, a tank 2 for surrounding the gyro case 1 and a suspension wire 3 for supporting the gyro case 1. The upper end of the suspension wire 3 is connected to the tank 2 and the lower end is connected to the gyro case 1. A liquid 7 such as high viscosity damping oil is stored in the tank 2.

Non-contact displacement detecting means 6 for detecting a relative displacement between the gyro case 1 and the tank 2 is mounted on the gyro case 1 and the tank 2. The non-contact displacement detecting means 6 has a primary side 4N,4S mounted on the outer surface of the gyro case 1 and a secondary side 5N,5S mounted on the inner surface of the tank 2. These primary side 4N,4S and secondary side 5N,5S are mounted on the north and south sides of the gyro apparatus, in other words, on the points where extended lines of the spin axis of the gyro rotor positioned horizontally along the meridian intersects the gyro case 1 and the tank 2. The detail of the non-contact displacement detecting means 6 will be described later.

A pair of horizontal shafts 8,8' are positioned at the points where a line perpendicular to the spin axis intersects the equator of the tank 2 and are mounted in the inner rings of the horizontal bearings 13,13' which are mounted on the horizontal ring 12 positioned to surround the tank 2. A horizontal gear 9 is mounted on one of the horizontal shafts 8 and is engaged with a horizontal pinion 11 of horizontal follow-up servo motor 10 which is mounted on the horizontal ring 12.

A pair of gimbal shafts 14,14' are positioned on the horizontal ring 12 perpendicular to the horizontal shafts 8,8' and are mounted in the inner rings of the gimbal bearings 15,15' which are mounted on the vertical ring 16 surrounding the tank 2. A pair of vertical shafts 17,17' are positioned on the upper and bottom ends of the vertical ring 16 and are mounted in the inner rings of the vertical bearings 25,25' of the plate means 24.

An azimuth gear 21 is mounted on the lower vertical shaft 17 and is engaged with an azimuth pinion 20 of the azimuth follow-up servo motor 19 which is mounted on the plate means 24. A compass card 22 is mounted on the upper vertical shaft 17'. A basic board 23 is mounted on the upper surface of the plate means 24 correspondingly. to the compass card 22. A reference line 26 for indicating the direction of ship's head is provided on the basic board 23.

Referring to FIG. 2, FIG. 3 and FIG. 4, the structure and function of the non-contact displacement detecting means 6 is described. FIG. 2 shows only the north side pair of pick-ups of two pairs of pick-ups of the non-contact displacement detecting means 6. This north side pick-up pair has a primary side coil 4N mounted on the outer surface of the gyro case 1 and a secondary side coil 5N mounted on the inner surface of the tank 2.

The coil wire of primary coil 4N is on a plane perpendicular to the spin axis of gyro and normally is magnetically excited by an alternate current which is used in common with the gyro power PS, thereby to generate an alternate magnetic field as shown by dotted arrows a1, a1.

The secondary coil 5N consists of four rectangular coils 5NW, 5NE,5NU,5NL, the first pair of coils 5NW,5NE being positioned laterally, and the second pair of coils 5NU,5NL being positioned in the vertical direction. The lateral coils 5NW,5NE are connected differentially to each other and the vertical coils 5NU,5NL are also connected differentially to each other.

Let us suppose that the primary side coil 4N is positioned at the center of the four rectangular coils 5NW,5NE,5NU, 5NL of the secondary side coil 5N. The magnetic flux due to the primary side coil 4N penetrates the four rectangular coils 5NW,5NE,5NU,5NL, to induce the same voltage in the four rectangular coils 5NW,5NE,5NU, 5NL. Accordingly, no output voltage is produced at the output terminal 2-1 of the lateral coils 5NW,5NE and the output terminal 2-2 of the vertical coils 5NU,5NL.

Let us suppose that the secondary side coil 5N is displaced horizontally to the west direction (the direction of the arrow W in FIG. 2) relative to the primary side coil 4N. The portion of the flux due to the primary side coil 4N, which penetrates the eastern rectangular coil 5NE, increases and the induced voltage increases. On the other hand, the flux portion penetrating the western rectangular coil 5NW decreases and the induced voltage decreases. Accordingly, a differential voltage is produced at the output terminal 2-1 of the lateral coils 5NW,5NE. No output voltage is produced at the output terminal 2-2 of the vertical coils 5NU,5NL.

If the secondary side coil 5N is displaced horizontally to the east direction (the direction of the arrow E in FIG. 2) relative to the primary side coil 4N, the operation is reverse to the case of the western displacement. The portion of the flux due to the primary side coil 4N, which penetrates the western rectangular coil 5NW, increases, the induced voltage increasing, and, the flux portion penetrating the eastern rectangular coil 5NE decreases, the induced voltage decreasing. Accordingly, a differential voltage of a reverse polarity is produced at the output terminal 2-1 of the lateral coils 5NW,5NE. No output voltage is produced at the output terminal 2-2 of the vertical coils 5NU,5NL.

If the secondary side coil 5N is displaced vertically (perpendicular to the arrow EW in FIG. 2) relative to the primary side coil 4N, the operation is similar. The portion, which penetrates the upper rectangular coil 5NU, of the flux due to the primary side coil 4N decreases or increases and the flux portion penetrating the lower rectangular coil 5NL increases or decreases. The voltage induced in the upper rectangular coil 5NU decreases or increases and the voltage induced in the lower rectangular coil 5NL increases or decreases. A differential voltage is produced at the output terminal 2-2 of the vertical coils 5NU,5NL.

In this way, if the N end of the tank 2 is displaced to the east or west direction and/or vertical direction relative to the gyro case 1, differential voltages are produced at the output terminals 2-1,2-2 of the two pairs of the rectangular coils 5NW,5NE,5NU,5NL of secondary side coil 5N. The polarity and amount of the differential voltage represents the azimuth and magnitude of displacement of the N end of the tank 2.

Referring to FIG. 3, the function of the non-contact displacement detecting means 6 is described hereinafter for determining the rotational displacement of tank 2 about an vertical axis relative to the gyro case 1. FIG. 3 is a diagram of the gyro case 1 as seen from above, showing a pair of the primary side coils 4N,4S mounted on the outer surface of the gyro case 1 and two pairs of lateral coils 5NW,5NE and 5SW,5SE of the secondary side coils 5N,5S mounted on the inner surface of the tank 2 of the non-contact displacement detecting means 6.

As described above, the north side coils 5NW,5NE and the south side coils 5SW,5SE are differentially connected respectively, and furthermore, the output terminal 2-1 of the north side coils 5NW,5NE and the output terminal 3-1 of the south side coils 5SW,5SE are also differentially connected. Accordingly, when the tank 2 is displaced laterally, or to the east or west direction linearly, relative to the gyro case 1, the differential voltage produced at the output terminal 2-1 of the north side coils 5NW,5NE is the same in magnitude and polarity as that of the output terminal 3-1 of the south side coils 5SW,5SE and therefore they are cancelled by each other to produce no output voltage at the output terminal 3-2.

However, if the tank 2 rotates about a vertical axis O (an axis perpendicular to the paper plane) relative to the gyro case 1, the differential voltage produced at the output terminal 2-1 of the north side coils 5NW,5NE is the same in magnitude but the reverse in polarity to that of the output terminal 3-1 of the south side coils 5SW,5SE thereby to produce a differential voltage at the output terminal 3-2. The magnitude and polarity of the differential voltage represents the direction and magnitude of the rotational displacement of the tank 2 about a vertical axis relative to the gyro case 1.

Referring to FIG. 4, the function of the non-contact displacement detecting means 6 is described hereinafter for detecting the rotational displacement of tank 2 about a horizontal axis relative to the gyro case 1. FIG. 4 is a diagram of the gyro case 1 as seen from a lateral direction, showing a pair of the primary side coils 4N,4S mounted on the outer surface of the gyro case 1 and two pairs of vertical coils 5NU,5NL and 5SU,5SL of the secondary side coils 5N,5S mounted on the inner surface of the tank 2 of the non-contact displacement detecting means 6.

Similarly, the north side secondary coils 5NU,5NL and the south side secondary coils 5SU,5SL are differentially connected. Accordingly, if the tank 2 is displaced vertically and linearly relative to the gyro case 1, no output voltage is produced at the output terminal 4-1. However, if the tank 2 rotates about a horizontal axis (east-west axis) relative to the gyro case 1, a differential voltage is produced at the output terminal 4-1. The magnitude and polarity of the differential voltage represents the direction and magnitude of the rotational displacement of the tank 2 about a horizontal axis relative to the gyro case 1.

The case that the tank 2 rotates about a vertical axis or a horizontal axis relative to the gyro 1 has been described , which is similar to the case that the gyro case 1 rotates about a vertical axis or a horizontal axis relative to the tank 2. Any rotational displacement between the gyro case 1 and the tank 2 can be detected by the non-contact displacement detecting means 6.

Referring to FIG. 3, the azimuth follow-up system is described. When the tank 2 rotates about a vertical axis relative to the gyro case 1, a voltage signal is produced at the vertical output terminal 3-2 of the non-contact displacement detecting means 6. The voltage signal produced at the vertical output terminal 3-2 is applied to the control wires of the azimuth servo motor 19 via or not via a servo amplifier 30. The rotation of the azimuth servo motor 19 is transmitted through the azimuth pinion 20, azimuth gear 21, vertical ring 16 and horizontal ring 12 to the tank 2. By such a way, the tank 2 rotates about a vertical axis so that the relative rotational displacement between the tank 2 and the gyro case 1 becomes zero.

By the azimuth follow-up system in such a way, the azimuth of the tank 2 always follows that of the spin axis of the gyro rotor. Accordingly, the N letter on the compass card 22 always follows the azimuth of spin axis of the gyro rotor. Therefore, the azimuth of ship's head can be read by the difference between the N letter on the compass card 22 and the reference line 26.

Since the relative rotational displacement between the tank 2 and the gyro case 1 becomes always zero by this azimuth follow-up system, no twisting torque can be produced in the suspension wire 3 connecting between the tank 2 and the gyro case 1. Accordingly, no disturbance is applied to the gyro case 1 by the azimuth follow-up system.

Error correction signal generating means 3—3 for correcting ballistic error, speed error and latitude error of the gyro is provided in the azimuth follow-up system. The error correction signal generating means 3—3 produces a voltage signal corresponding to the errors due to the acceleration or deceleration, velocity and latitude of a ship and supplies it to the azimuth servo motor 19 via or not via a servo amplifier 30. The azimuth servo motor 19 causes the tank 2 to rotate in order to bias the follow-up operation by the azimuth follow-up system. By this, a twisting stress is produced in the suspension wire 3 to cause the gyro case 1 to rotate about a vertical axis so that the ballistic error, speed error, latitude error or the like can be corrected.

Referring to FIG. 4, the horizontal follow-up system is described. When the tank 2 rotates about a horizontal axis relative to the gyro case 1, a voltage signal is produced at the horizontal output terminal 4-1 of the non-contact displacement detecting means 6. The voltage signal produced at the horizontal output terminal 4-1 is applied to the control wires of the horizontal servo motor 10 via or not via the servo amplifier 31. The rotation of the horizontal servo motor 10 is transmitted through the horizontal pinion 11 and horizontal gear 9 to the tank 2. By this, the tank 2 rotates about a horizontal axis so that the relative rotational displacement between the tank 2 and the gyro case 1 becomes zero.

Referring to FIG. 5, the north-seeking operation of the gyro is described. FIG. 5 shows the gyro case 1 positioned in the tank 2 schematically, in which the tank 2 is filled with a high viscosity damping liquid 7 and the gyro case 1 immersed in the damping liquid 7 is suspended with the suspension wire 3.

Let us suppose that the gravity center of the gyro case 1 is positioned at a point $O_1$ and the center of the tank 2 is at $O_2$. The connecting point between the suspension wire 3 and the tank 2 is denoted by P and the connecting point between the suspension wire 3 and the gyro case 1 is denoted by Q. The center line of the tank 2 passes through the line $PO_2$. The spin axis of gyro rotor(shown by the dotted rectangular part) intersects the gyro case 1 at A,B and the points on the tank 2 corresponding to A,B are denoted by A',B'. A horizontal plane is denoted by H—H'.

When the spin axis of the gyro rotor is horizontal ($\theta=0°$), the north-south line A'B' of the tank 2 is in alignment with the spin axis and the gravity center $O_1$ of the gyro case 1 coincides with the center point $O_2$ of the tank 2.

Let us suppose that the spin axis of the gyro rotor is inclined relative to the horizontal plane H—H' at an inclination angle of θ and the north seeking end, that is, the A side of the gyro case 1 is raised relative to the horizontal plane H—H'. As described above, by the horizontal follow-up servo system, the tank 2 rotates and slants about a horizontal axis to follow the inclination angle θ of the gyro rotor. Accordingly, the center axis $PO_2$ of the tank 2 is inclined relative to a vertical line at an inclination angle θ.

If no outer force is applied, the suspension wire 3 is aligned with a vertical line. A moment M to the gyro case 1 around the gravity center $O_1$ is produced by the tensile force T of the suspension wire 3. Assuming that the distance between the gravity $O_1$ of the gyro case 1 and the connection point Q is r and the residual weight of the gyro case 1 which is obtained by subtracting the buoyancy due to the damping liquid 7 from the gyro case 1 is mg, the moment M applied to the gyro case 1 is expressed by the following equation.

$$M = Tr \sin\theta = mgr \sin\theta \qquad \text{[EQUATION 1]}$$

This moment M acts as a torque to the gyro rotor around a horizontal axis (a line passing through the gravity center $O_1$ and perpendicular to the paper). By this way, it is possible "to apply a torque proportional to an inclination angle of the spin axis relative to a horizontal plane about a horizontal axis of the gyro", and therefore a north-seeking force can be produced to constitute a gyro compass. By selecting the value of the distance r, weight mg and angular momentum of the gyro, the period of north-seeking motion can be tens of minutes to hundred and tens minutes.

Referring to FIG. 6, the damping means of the gyro is described. The damping means of the type which is used in such a gyro compass as described above is so composed as "to apply a torque proportional to an inclination angle of the spin axis relative to a horizontal plane about a vertical axis of the gyro". As described above, if the spin axis of the gyro rotor is inclined relative to a horizontal plane H—H' at an inclination angle θ, the tank 2 is also inclined at an inclination angle θ due to the operation of the horizontal follow-up system.

As shown in FIG. 5, the gyro case 1 moves toward a point B' on the tank 2 by a distance ξ(O1–O2) relative to the tank 2 until the suspension wire 3 coincides with a vertical line. The displacement ξ is proportional to the inclination angle θ of the spin axis of the gyro rotor relative to a horizontal plane H—H'. Accordingly, if the relative displacement θ of the gyro case 1 is electrically detected and the follow-up position due to the azimuth follow-up system is biased in response to the electrical detection, to cause the suspension wire 3 to be twisted, a desirable damping function can be obtained.

In the meanwhile, because the suspension wire 3 has a small rigidity, it draws actually a deflection curve as shown by a dotted line when the gyro case 1 is inclined relative to a horizontal plane H—H'. Accordingly, the displacement ξ($O_1$–$O_2$) of the gyro case 1 along the line A'B' is also reduced by a very small amount. However, the suspension wire 3 has a sufficient flexibility and such a reduction of displacement is very small, the influences thereof are a little in a practical plan. Therefore, the description will be made hereinafter ignoring such a reduction of displacement.

FIG. 6 is a diagram showing a damping system in which the gyro case 1 is seen from above. The damping system is provided in addition in the azimuth follow-up system. It shows a pair of primary side coils 4N,4S mounted on the outer surface of the gyro case 1 and four pairs of secondary side coils 5NW,5NE and 5SW,5SE and 5NU,5NL and 5SU, 5SL mounted on the inner surface of the tank 2 of the non-contact displacement detecting means 6.

As shown by the drawing, further a pair of displacement detecting coils 14-2,14-3 are provided on the north-south side of the secondary side coils. The displacement detecting coils 14-2,14-3 are positioned parallel to the lateral coils 5NW,5NE and 5SW,5SE of the secondary side coils and are connected differentially. Output terminal 14-1 of the displacement detecting coils 14-2,14-3 outputs a differential voltage proportional to the displacement ξ of the gyro case 1.

The output terminal 14-1 is additionally connected to the output terminal 3-2 of the azimuth follow-up system and is connected to the control coils of azimuth servo motor 19 via or not via a servo amplifier 30. Accordingly, the voltage signal applied to the control coils of the azimuth servo motor 19 has an excess voltage signal portion corresponding to that from the output terminal 14-1, which can bias the follow-up action of the tank 2 to the gyro case 1.

The tank 2 rotates about a vertical axis to bias the action of the azimuth follow-up system, causing a twisting torque to be produced in the suspension wire 3. Accordingly, the gyro case 1 receives a twisting torque proportional to the displacement ξ of gyro case 1. By this way, the damping function of the gyro can be produced.

Referring to FIG. 7A–FIG. 7D, the damping function of the gyro is described in detail. FIG. 7A–FIG. 7D are block diagrams illustrating the damping system of FIG. 6. A voltage signal $V_{14}$ at the output terminal 14-1 is determined, which is required for rotating the tank 2 about a vertical axis at a twisting angle ψ when the displacement of the gyro case 1 along the spin axis is ξ. Let us suppose that the output voltage of the error correction signal generating means 3—3 is zero.

If the tank 2 rotates about a vertical axis at a twisting angle ψ, a twisting torque $T_Z = k_T \psi$ is produced in the suspension wire 3 and the gyro case 1 receives such a twisting torque $T_Z = k_T \psi$.

On the other hand, since the damping torque is proportional to the displacement ξ of the gyro case 1 along the spin axis, it is expressed as $\mu\xi$ using a proportional constant $\mu$. This should be equal to the twisting torque $k_T \psi$.

$$T_Z = k_T \psi = \mu\xi \qquad \text{[EQUATION 2]}$$

Accordingly, the twisting angle ψ of the tank 2 about a vertical axis is expressed by the following equation.

$$\psi = \mu\xi / k_T \qquad \text{[EQUATION 3]}$$

Let us suppose that the ratio of the twisting angle ψ of the tank 2 about a vertical axis to the voltage signal $V_{14}$ at the output terminal 14-1 is q.

$$q = \psi / V_{14} \qquad \text{[EQUATION 4]}$$

Consequently, the voltage signal $V_{14}$ at the output terminal 14-1 is expressed by the following equation, using the gain q.

$$V_{14} = \psi/q = \mu\xi/qk_T \qquad \text{[EQUATION 5]}$$

By multiplying each of the transfer functions in blocks to the displacement ξ of the gyro case 1 in turn, the value $\mu\xi$ is obtained as a damping torque $T_Z$.

FIG. 7B shows one block which is made by combining the two blocks. FIG. 7C is a block diagram in which the viscosity of the liquid 7 in the tank 2 is taken into consideration. If the tank 2 is rotated about a vertical axis at a twisting angle ψ, a viscosity torque proportional to the rotational angular velocity d ψ/dt is applied to the gyro case 1. Accordingly, the torque $T_Z$ exerted on the gyro case 1 is expressed as the following equation.

$$T_Z = (Cs + k_T)\psi \quad \text{[EQUATION 6]}$$

In the equation, C is a viscosity torque constant, and s is Laplace's operator. In this case, the torque $T_Z$ exerted on the gyro case 1 includes a viscosity torque Cs ψ, and therefore it is difficult to obtain a torque μξ proportional to the displacement ξ as a damping torque $T_Z$. Accordingly, a first-order lag filter of a time constant $T_F$ should be inserted as shown in FIG. 7D. The first-order lag filter may be for example provided in the servo amplifier 30.

Prior art gyro compasses can exhibit excellent performances without problem at any ordinary navigation speed, for example, 10 to 20 Knots. However, recently high speed ships have increased and there has been a plan to constitute a new standard for gyro compasses mounted on such high speed ships. For example, there has been a plan to constitute a standard for gyro compasses to endure 70 Knots or more.

In such high speed ships, during acceleration or deceleration, or rotation of a ship, the north-south acceleration exerted on a gyro compass increases to cause influences on the north-seeking means or the like. For example, if such gyro sphere type north-seeking means as described above is used, it is possible for the gyro case 1 in the tank 2 to come into collision with the inner surface of the tank 2. Assuming that the viscosity of the liquid 7 is increased to prevent such collision of the gyro case 1, however, the viscosity term of the equation 6 increases and it becomes difficult to obtain a torque μξ proportional to the displacement ξ as a damping torque $T_Z$ to be applied to the gyro case 1. Accordingly, it has been impossible to increase the viscosity of the liquid 7 in the tank 2 in prior art gyro compasses.

According to prior art methods for eliminating the speed error and ballistic error, a control torque is applied about an axis perpendicular to the spin axis of gyro rotor. More particularly, a control torque is applied about an east-west horizontal axis and a vertical axis. At least, it is necessary that a control torque is applied about a vertical axis.

In the above described example of gyro compass, the speed error and ballistic error are eliminated by adding the output of the error correcting signal generating means 3—3 to the azimuth follow-up system or damping system. By biasing the tank 2 about a vertical axis relative to the gyro case 1, a twisting torque is produced in the suspension wire 3 to exert a torque on the gyro case 1 causing a control torque.

However, if the speed error or ballistic error increases, the twisting torque produced in the suspension wire 3 also becomes large. If a large value is selected as a twisting torque constant of the suspension wire 3 so that the suspension wire 3 can bear the twisting torque generated in therein, the follow-up accuracy of the azimuth follow-up system becomes lower and high accurate gyro compass can not be accomplished.

Accordingly, in case of the prior art gyro compass, if the magnitude of speed error or ballistic error becomes large, it is necessary to provide a vertical torquer or the like, to which the output of the error correction signal generating means 3—3 is supplied.

In the meanwhile, there has been a problem of "speed error and ballistic error" in gyro compasses. The speed error is an error due to a motion of a ship and is produced regardless of the composition and type of the gyro compass.

A ship moving on the surface of the earth means physically the ship performing a circular motion about the center of the earth. Accordingly, the ship performs both a circular motion about a rotational axis of the earth and a circular motion about another rotational axis. Therefore, the spin axis of gyro points not to the vector of rotation of the earth but to "the direction of resultant of two rotation vectors". The difference between the two is speed error δ, which is expressed by the following equation.

$$\delta = V \cos C / (R\Omega \cos \lambda + V \sin C) \quad \text{[EQUATION 7]}$$

In the equation, V is the speed of ship, R is the radius of the earth, Ω is the rotational angular velocity of the earth, λ is latitude and C is azimuth angle. The azimuth angle C is a deviation of ship's head relative to the due north (the meridian), the sign of which is positive in clockwise direction.

Referring to FIG. 8A and FIG. 8B, FIG. 8A shows a navigation track on which a ship 80 heading northward has turned round clockwise at 180°, so that the ship's head points to the south. FIG. 8B shows changes of the error δ in the azimuth $\phi_M$ of ship's head indicated by gyro compass. When a ship is running at a constant speed, ballistic error is zero and therefore the azimuth angle $\phi_M$ of ship's head indicated by gyro compass points to an azimuth angle with a deviation of the speed error δ as shown by the equation 7. The speed errors $\delta_1$ and $\delta_2$ of a ship heading northward and southward are obtained by substituting the azimuth angles C=0° and C=180° into the equation 7 respectively.

$$\delta_1 = V/(R\Omega \cos \lambda)$$

$$\delta_2 = -V/(R\Omega \cos \lambda) \quad \text{[EQUATION 8]}$$

When a ship is running northward at a constant speed, the azimuth angle $\phi_M$ of the ship's head indicated by gyro compass keeps a stable state with a westery deviation angle $\delta_1$ as shown by the equation 8, while when a ship is running southward at a constant speed, the azimuth angle $\phi_M$ of the ship's head indicated by gyro compass keeps a stable state with an eastery deviation angle $\delta_2$ as shown by the equation 8.

Let us suppose that the ship 80 has started to turn round at a time $t_1$ and finished the turning round at a time $t_2$. The error of the azimuth angle of the ship's head $\phi_M$ indicated by gyro compass at the time $t_2$ of the end of turning is greater than the angle $\delta_2$ which is obtained by the equation 8, as shown in FIG. 8B. This is because ballistic error has been generated due to the turning. The difference of speed error between before and after the turning is referred to as ballistic error $\delta_B$.

$$\delta_B = (\delta_2 + \Delta\delta) - \delta_1 \quad \text{[EQUATION 9]}$$

It is at the time $t_3$ when a certain stabilizing time has passed after the time $t_2$ of the end of turning that the azimuth angle $\phi_M$ of the ship's head indicated by gyro compass is stabilized to point to an azimuth angle with an eastery deviation angle $\delta_2$ as shown by the equation 8.

Ballistic error is a transient error, which is produced by acceleration applied in a horizontal direction to the north-seeking means when a ship changes its speed or turns round. During turning round, a ship is subjected to acceleration. In the above example, during turning round at 180° in clockwise direction, the ship is subjected to an acceleration a from south to north as a north-south component of centrifugal force. Therefore, in FIG. 5, the gyro case 1 is urged to the north (the direction from B to A) to be inclined at an angle θ=α/g which is proportional to the acceleration α. The torque applied to the gyro case 1 due to this inclination can be obtained by substituting the angle θ=α/g into the equation 1.

$T_S = mgr \sin(\alpha/g)$ [EQUATION 10]

In the equation 10, r is length of moment's arm, α is northward acceleration and g is gravity acceleration. This torque acts about a horizontal axis passing through the point O and perpendicular to the gyro spin axis as is similar to the torque producing a north-seeking action. Accordingly, the gyro spin axis generates a clockwise precession around a vertical axis (gravity axis) passing through the point O. This is ballistic error.

If the value of ballistic error during turning round can be controlled, it is possible to make the ballistic error $\delta_B$ to be equal to the difference of speed error between before and after the turning of a ship.

$\delta_B = \delta_2 - \delta_1 = -2V/(R\Omega \cos \lambda)$ [EQUATION 11]

It has been known that if the north-seeking period of gyro spin axis is approximately 84.3 minutes, this condition can be satisfied. In conventional ships, since they are designed to satisfy the equation 11, it takes approximately 3 to 4 hours to stabilize a gyro compass after its starting.

However, since the north-seeking period of gyro spin axis is a function of latitude λ, the equation 11 holds true only at a certain latitude. This latitude is referred to a reference latitude. In conventional designs, as a reference latitude approximately 53° is selected. This is because it can minimize the error, though the location of ship is biased from the reference latitude, as long as it is within the area from the equator to latitude 60° which is a normal navigation region of ship.

Referring to FIG. 9A–FIG. 9D, an example of prior art method for correcting speed error is described. Ships are provided with a gyro compass, or master compass and besides it a plurality of repeater compasses. Master compass and repeater compass are in a relationship similar to that between a mother clock and children clocks, and the repeater compass indicates synchronously an azimuth angle which has been supplied by the master compass. Ships are steered by using a steering repeater compass.

Many methods for correcting speed error has been known however, an example is described hereinafter. Firstly, a speed error correction angle $\delta_V$ will be determined by the equation 7. A repeater compass indicates an angle which can be obtained by correcting an azimuth angle $\phi_M$ indicated by master compass with the speed error correction angle $\phi_V$.

As can be seen from the equation 7, if the azimuth angle C of a ship exceeds 90°, the speed error correction angle $\phi_V$ changes in sign. Accordingly, a relation whether larger or smaller between the azimuth angle $\phi_M$ indicated by master compass and the azimuth angle $\phi_M$ indicated by repeater compass changes. In the meanwhile, when the azimuth angle C of a ship is 90°, or the ship's head points to the due east, the speed error correction angle $\phi_V$ is zero. Accordingly, the azimuth angle $\phi_R$ indicated by repeater compass is equal to the azimuth angle $\phi_M$ indicated by master compass.

$0 < C < 90°$ $\phi_V > 0, \phi_R > \phi_M$ $C = 90°$ $\phi_V = 0, \phi_R = \phi_M$ $C > 90°$ $\phi_V < 0, \phi_R > \phi_M$ [EQUATION 12]

when the speed error correction angle $\delta_V$ is to be obtained by the equation 7, the azimuth angle C of a ship is required but is not yet concisely determined. Accordingly, as an azimuth angle C to be substituted in the equation 7, the azimuth angle $\phi_M$ of ship's head indicated by master compass, or the output of azimuth indicator 35 is used.

Referring to FIG. 9A–FIG. 9D, reference symbols used in FIG. 9A–FIG. 9D represent as follows:

$\delta_V = \angle POH$: speed error correction angle $\delta_A = \angle n_o On$: ballistic error $C = \angle NOH$: actual azimuth angle of a ship's head $\phi_M = \angle nOH$: azimuth angle indicated by master compass $\phi_R = \angle nOP$: azimuth angle indicated by repeater compass $\phi_{GS} = \angle nON$: azimuth angle of gyro spin axis [EQUATION 13]

FIG. 9A shows a ship 80 heading northward at a constant velocity. The origin O is located at the center of master compass mounted on the ship 80. The line GS represents the spin axis of gyro rotor and the line NS represents the meridian. Since the ship 80 is running northward, the azimuth angle OH of ship's head coincides with the due north ON. The azimuth angle $On_o$ of the master compass has an westery deviation angle $\angle n_o ON$ from the due north ON.

As long as the ship 80 is running northward at a constant velocity, no ballistic error is produced and therefore this angle $\angle n_o ON$ due to westery deviation is equal to the speed error correction angle $\delta V$ obtained by the equation 7. The repeater compass indicates an azimuth angle which can be obtained by correcting the azimuth angle $\angle n_o ON$ of the master compass with a speed error correction angle $\delta_V$ which can be obtained by the equation 7, as described above. Therefore, the repeater compass indicates the due north ON.

FIG. 9B shows that a ship 80 has started to turn round in clockwise direction and the ship's head OH is at the first quadrant of plane coordinate. During turning round, since the gyro case is subjected to acceleration a along the north-south direction and thereby is inclined, the gyro rotor performs precession. By precession, the spin axis GS of gyro rotor turns round from OnO to On in clockwise direction. The deviation angle $\angle n_o On$ of spin axis GS of gyro rotor due to this precession is ballistic error $\delta_A$.

At this moment, the azimuth angle $\phi_M$ of ship's head indicated by so master compass is $\angle n_o OH$. Let us suppose that the speed error Ad correction angle $\delta_V$ obtained by substituting this azimuth angle $\phi_M = \angle n_o OH$ into the equation 7 is $\delta_V = \angle POH$. The repeater compass indicates an angle which can be obtained by correcting the azimuth angle $\phi M = \angle n_o OH$ indicated by master compass with the speed error correction angle $\delta_V = \angle POH$. Accordingly, the repeater compass indicates an angle $\angle nOP$ as an azimuth angle $\phi_M$ of ship's head. As described above, since the azimuth angle $\phi_M$ indicated by master compass is less than 90°, the azimuth angle $\phi_R$ indicated by repeater compass is smaller than the azimuth angle $\phi_M$ indicated by master compass.

FIG. 9C shows that the ship 80 has turned round further and the azimuth angle OH of ship's head is at the second quadrant. Due to ballistic error $\delta_A$, the spin axis GS of master compass turns round further to the line On so that the azimuth angle $\phi_M$ indicated by master compass is $\angle nOH$. The azimuth angle $\phi_R = \angle NOP$ indicated by repeater compass is an angle which can be obtained by correcting the azimuth angle $\phi_M = \angle nOH$ indicated by master compass with the speed error correction angle $\delta_V = \angle POH$. As described above, since the azimuth angle $\phi_M$ indicated by master compass exceeds 90°, the azimuth angle $\phi_R$ indicated by repeater compass is greater than the azimuth angle $\phi_M$ indicated by master compass.

FIG. 9D shows that the ship 80 has finished the turning round and the azimuth angle OH of ship's head points to the due south OS. Since, due to ballistic error $\delta_A$ during turning, the spin axis GS of master compass has turned round to the line On, the azimuth angle $\phi_M$ indicated by master compass is $\angle nOH=180°-\angle NON$. The azimuth angle $\phi_R=\angle nOP$ indicated by repeater compass is an angle which can be obtained by correcting the azimuth angle $\phi_M=\angle nOH$ indicated by master compass with the speed error correction angle $\delta_V=\angle POH$.

The speed error correction angle $\delta_V=\angle POH$ at the end of turning round is equal in magnitude but inverse in sign to that $\delta_V=\angle n_oOH$ at the beginning of turning round, as indicated by the equation 8.

$$\angle n_oON=V/(R\Omega \cos \lambda)$$

$$\angle POH=-V/(R\Omega \cos \lambda) \quad \text{[EQUATION 14]}$$

Accordingly, the following equation can be obtained.

$$\angle n_oON=\angle nON=V/(R\Omega \cos \lambda) \quad \text{[EQUATION 15]}$$

Consequently, the azimuth angle $\phi_M$ indicated by master compass is $\phi_M=\angle nOH=180°-\angle n_oON=180°-V/(R\Omega \cos \lambda)$. The azimuth angle $\phi_R=\angle nOP$ indicated by repeater compass is an angle which can be obtained by correcting the azimuth angle $\phi_M$ indicated by master compass with the speed error correction angle $\angle POH=-V/(R\Omega \cos \lambda)$ obtained by calculation. Accordingly, the azimuth angle $\phi_R=\angle nOP$ indicated by repeater is 180°.

Although, before and after the turning round of a ship, the azimuth angle $\phi_M$ of ship's head indicated by master compass includes westery or eastery deviation angle corresponding to the speed error as shown by the equation 8, the azimuth angle $\phi_R$ indicated by repeater compass is 0° or 180° accurately.

However, it has been found that a new problem is produced which By has not been known in prior art gyro compasses.

Referring to FIG. 10A–FIG. 10D, FIG.10A–FIG. 10D show that a ship heading northward has turned round in clockwise direction at 180° and then runs southward as are similar to FIG. 9A–FIG. 9D. FIG. 10A is the same as FIG. 9A and shows a ship heading north at a constant speed. The azimuth angle $On_o$ of master compass has a westery deviation angle $\angle n_oON$ relative to the due north ON and the azimuth angle of repeater compass is corrected with the westery angle $\angle n_oON$ to point to the due north ON.

FIG. 10B shows that a ship has begun to turn round clockwise and the ship's head is in the first quadrant. The gyro case 1 is moved to the north (the direction from B to A in FIG. 5) due to the north-south acceleration a and is inclined. However, since the liquid 7. has a high viscosity, the displacement of gyro case 1 is small and the inclination angle $\theta$ of gyro case 1 is also small. In case of prior art liquid 7, the inclination angle $\theta$ of gyro case 1 increases proportional to the north-south acceleration $\theta$, however, it is small in case of a higher viscosity liquid.

Accordingly, since the torque exerted on gyro case 1 is smaller than that obtained from the equation 10, the ballistic error $\angle n_oOn$ is smaller than that of FIG. 9B and the azimuth angle $\phi_M=\angle nOH$ indicated by master compass becomes greater. However, since the speed error correction angle $\delta_V=HOP$ for correcting the azimuth angle $\phi_M$ of master compass is determined by the equation 7, it is the same as that of FIG. 9B. Accordingly, the azimuth angle $\phi_R=\angle nOP$ indicated by repeater compass is greater than that of FIG. 9B.

FIG. 10C shows that a ship has turned round clockwise further and the ship's head is in the second quadrant. Similarly, the ballistic error $\angle n_oOn$ is smaller than that of FIG. 9C and the azimuth On of master compass yet includes a westery deviation angle $\angle nON$ relative to the due north ON.

Since the azimuth angle $\phi_M$ indicated by master compass is greater than 90° and the sign of speed error correction angle $\delta_V$ is negative, the azimuth angle $\phi_R$ indicated by repeater compass is greater than that $\phi_M$ indicated by master compass.

FIG. 10D shows that a ship has turned round clockwise further. In this state, the azimuth On of master compass yet includes a very small westery deviation angle $\angle nON$ relative to the due north ON, but is very near to the due north ON. The speed error correction angle $\delta_V=\angle POH$ is approximately equal to that obtained by calculation in case of FIG. 9D. Accordingly, the azimuth angle $\phi_R=\angle nOP$ indicated by repeater compass is approximately 180°. At this moment, the steersman changes the steering from turning round to straight running, but actually the ship's head OH is not pointing to the due south.

In this way, the ship which should run to the south, run actually on a course biased from the due south OS. In the meanwhile, the spin axis GS of gyro rotor of master compass turns round clockwise gradually and when the ship runs with its azimuth OH pointing to the due south, it will be located finally on the same rotational position as that of FIG. 9D.

This is because the ballistic error $\delta_A$ does not become zero immediately after the ship has finished the turning round and has begun to run straight to the south. The inclined gyro case 1 is positioned in a high viscosity liquid 7 and therefore, it does not recover the original position at once although acceleration $\alpha$ become zero. Accordingly, a torque due to the inclination is exerted on gyro case 1 to cause a ballistic error $\delta_A$ until the gyro case 1 returns exactly to the original position.

In any way, an error is produced at every acceleration or deceleration, or turning round, and it can not be eliminated until a certain time, for example several minutes to tens of minutes have passed after the change-over to a constant speed navigation.

An example of a gyro compass of the type having a gyro sphere type north-seeking apparatus has been described, however, such an error is not peculiar to a gyro sphere type north-seeking apparatus, but is in common in any north-seeking apparatus which generates ballistic error and has a relatively long time constant.

In consideration of these points, the purpose of the present invention is to use a high viscosity damping liquid as a liquid 7 in the tank 2.

In consideration of these points, the purpose of the present invention is to eliminate large speed error and ballistic error without providing a vertical torquer or the like.

In consideration of these points, the purpose of the present invention is to eliminate error produced during acceleration or deceleration, or turning round in gyro compass which has a north-seeking apparatus which produces ballistic error and has a relatively long time constant.

SUMMARY OF THE INVENTION

According to the present invention, there is provided a gyrocompass of the type having a gyro case containing therein a gyro rotor having an approximately horizontal spin axis, a container for surrounding the gyro case and for accommodating liquid therein, first supporting means for supporting the gyro case within the container, second supporting means for supporting the container with a freedom of three axes, an azimuth follow-up loop for causing the container to follow the gyro case about a vertical axis, and a damping loop for applying a torque proportional to the inclination angle of the spin axis of gyro rotor relative to a horizontal plane to the gyro case about a vertical axis, wherein a substantially first-order lag filter is provided in the azimuth follow-up loop or the damping loop, the substantially first-order lag filter having a time constant TF which is approximately equal to a ratio $C/k_T$ of the viscosity torque coefficient C to the twisting torque coefficient $k_T$ of the torque produced between the container and the gyro case.

A desired damping torque can be obtained only by setting the time constant $T_F$ of the substantially first-order lag filter to be equal to a ratio $C/k_T$, and therefore it is possible to increase the viscosity of liquid in the container to a high level. Accordingly, the gyro case does not come into collision with the container on acceleration or deceleration, or rotation of a high speed ship.

According to the present invention, in a gyro compass, error correction signal generating means for generating an error correction signal is provided in the azimuth follow-up loop or the damping loop, a signal which can be obtained by multiplying a first transfer function to the output signal of the error correction signal generating means being supplied to the substantially first-order lag filter, and a signal which can be obtained by multiplying a second transfer function to the signal obtained by multiplying the first transfer function being added to the output of the substantially first-order lag filter, thereby to produce a desired change in the output of the substantially first-order lag filter so that the container can rotate about a vertical axis relative to the gyro case.

Accordingly, an additional torque for eliminating speed error, ballistic error, latitude error or the like can be applied to the gyro case without providing a vertical torquer or the like.

According to an example of the present invention, in a gyro compass, the first transfer function is a constant value of 1 and the second transfer function is a constant value of 0. According to another example of the present invention, the first transfer function is a constant value with a negative sign and the second transfer function is a constant value of 1.

According to an example of the present invention, in a gyro compass, the damping system has a displacement detecting pick-up for detecting a displacement of the gyro case relative to the container, and the error correction signal generating means is connected to output terminal of the displacement detecting pick-up.

According to the present invention, there is provided a gyrocompass of the type having a gyro case containing therein a gyro rotor having an approximately horizontal spin axis, supporting means for supporting said gyro case with a freedom of three axes, north-seeking means for applying a torque proportional to an inclination angle of said spin axis relative to a horizontal plane and time lagged by a predetermined time constant to said gyro case about a horizontal axis perpendicular to said spin axis, an azimuth indicator for indicating the azimuth angle of vehicle head relative to said spin axis, and speed error correcting means for calculating a speed error correcting angle from the output of said azimuth indicator, speed and latitude of vehicle and for correcting said output of azimuth indicator by said speed error correcting angle, wherein, said speed error correcting means has a substantially first-order lag filter having a time constant which is approximately equal to that of said north-seeking means, and is applied to correct said output of said azimuth indicator by said speed error correcting angle through said substantially first-order lag filter.

According to the present invention, said time constant of said substantially first-order lag filter is determined so that said speed error correcting angle is substantially equal to the angle between said spin axis and the meridian during acceleration or deceleration, or turning of vehicle.

Accordingly, in a gyro compass which has a north-seeking apparatus which produces a ballistic error and has a relatively long time constant, the error produced during acceleration or deceleration, or turning round can be eliminated completely.

BRIEF DESCRIPTION OF THE DRAWINGS

FIG. 12 is a block diagram of an error correction part of the gyro compass according to the present invention.

FIG. 13A shows a ship heading northward at a constant speed. FIG. 13B shows a ship turning round clockwise. FIG. 13C shows a ship turning round clockwise further. FIG. 13D and FIG. 13E show a ship heading southward at a constant speed.

Referring to FIG. 11A–FIG. 11C, an example of gyro compass according to the present invention is described. FIG. 11A–FIG. 11C are block diagrams of a damping system of the present example of the gyro compass which are similar to FIG. 7A–FIG. 7D. Referring to FIG. 11A, a first embodiment of the present invention is described. The input of the control loop of the damping system according to the present embodiment is the displacement $\xi$ of gyro case 1 and the output of the control loop is the damping torque $T_Z = \mu \xi$ which is applied to the gyro case 1.

Figure 1:
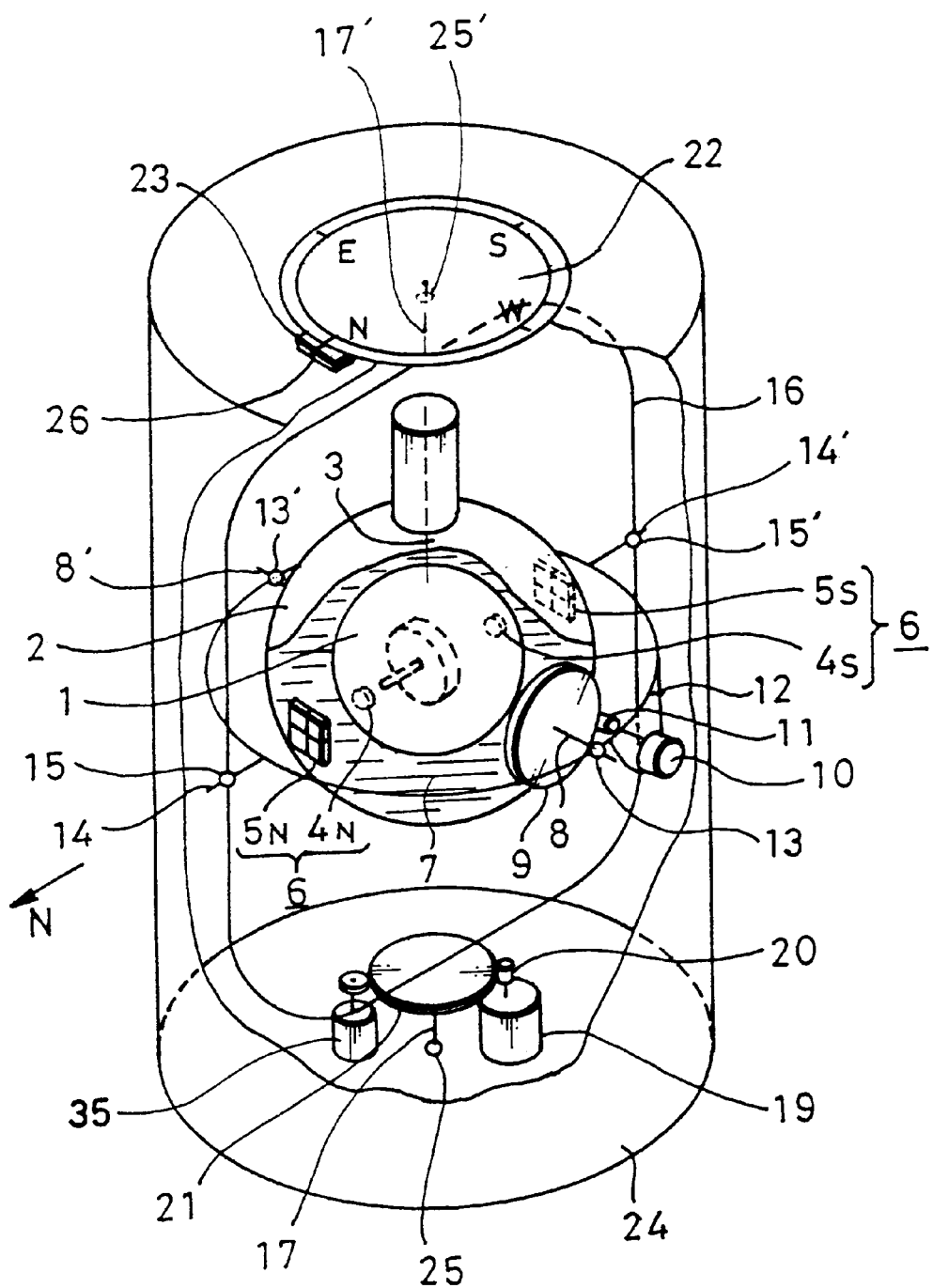
FIG. 1 is a diagram showing an example of the composition of a prior art gyro compass.
Figure 2:
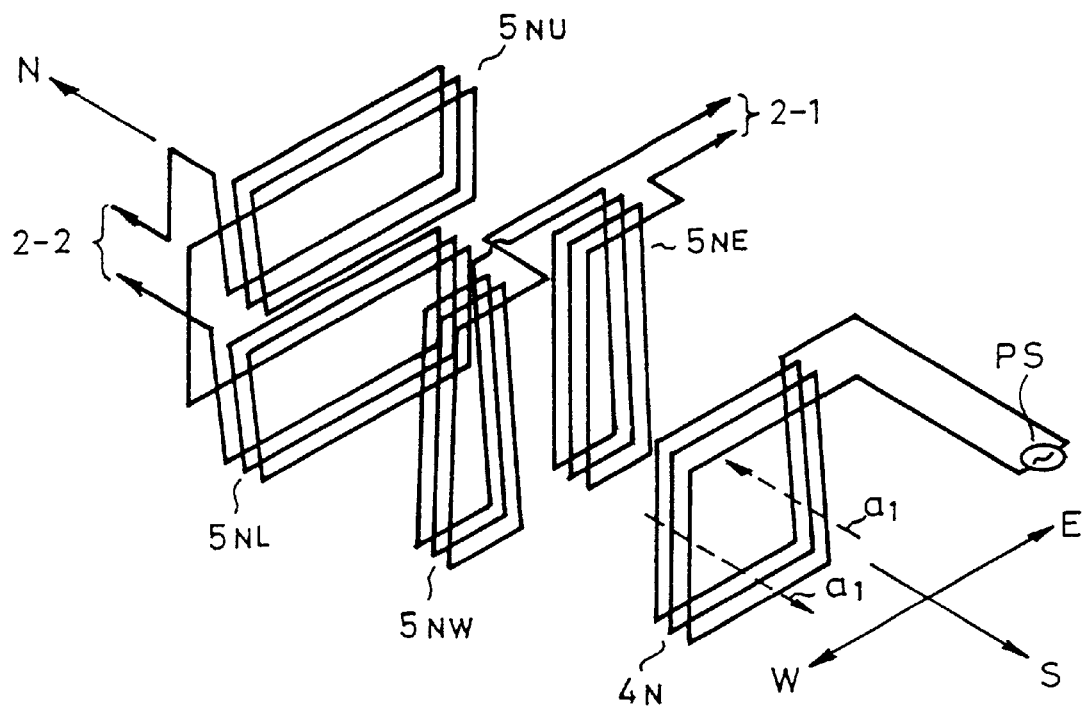
FIG. 2 is a diagram showing an example of the composition of the non-contact displacement detecting means of a prior art gyro compass.
Figure 3:
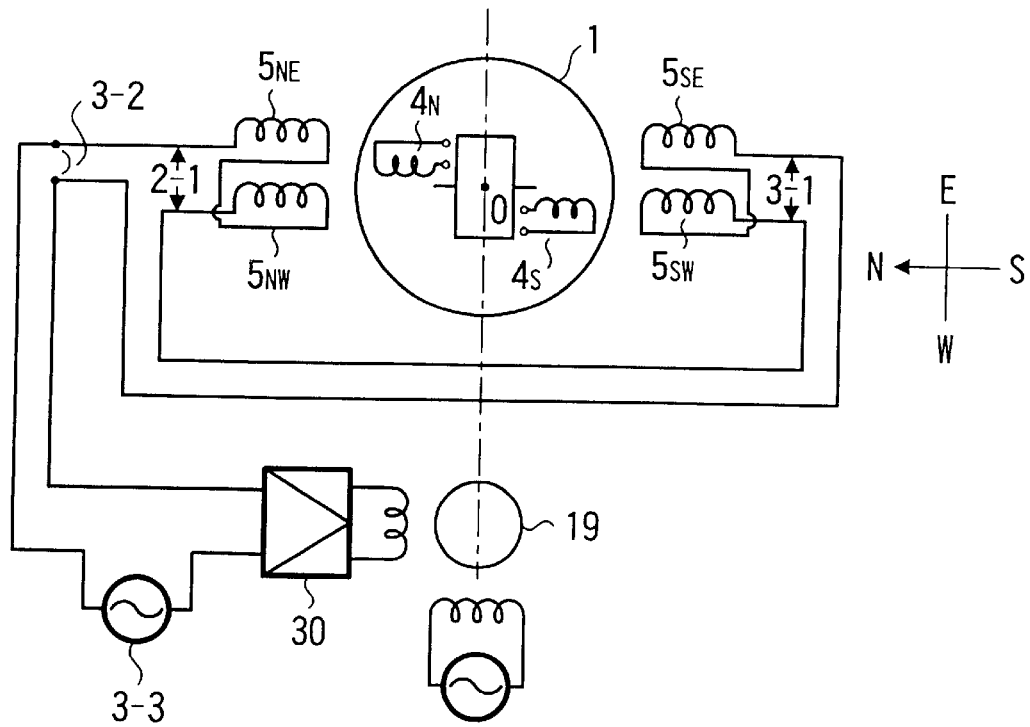
FIG. 3 is a diagram showing an example of the composition of the azimuth follow-up system of a prior art gyro compass.
Figure 4:
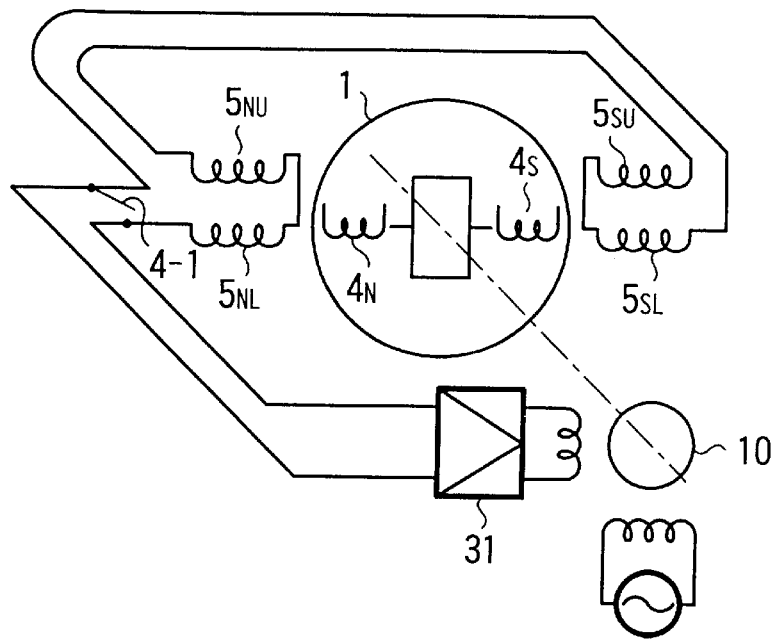
FIG. 4 is a diagram showing an example of the composition of the horizontal follow-up system of a prior art gyro compass.

The displacement $\xi$ of gyro case 1 may be detected by the displacement detecting coils 14-2,14-3 which are additionally provided on a north-south side of the secondary side coil of the non-contact displacement detecting means 6 as described with reference to FIG. 6. If the gyro case 1 moves along the direction of spin axis, an output voltage V14 proportional to the displacement $\xi$ of gyro case 1 is produced at the output terminal 14-1 of the displacement detecting coils 14-2,14-3.

The conditions for obtaining the damping torque $T_Z = \mu \xi$ from this output voltage $V_{14}$ will be determined. Transfer functions in the blocks are multiplied to the displacement $\xi$ of gyro case 1 in turn and the resultant is assumed to be equal to the damping torque $T_Z = \mu \xi$ resulting in the following relation.

$$TF = C/k_T \qquad \text{[EQUATION 16]}$$

As can be seen from this equation, according to the present example, a desired damping torque $T_Z = \mu \xi$ can be obtained by setting the time constant TF of the first-order lag filter to be equal to a ratio $C/k_T$ of the viscosity torque coefficient C to the twisting torque coefficient $k_T$.

Assuming that the twisting torque coefficient $k_T$ of the suspension wire 3 is constant, the time constant $T_F$ of the first-order lag filter should be changed depending on the value of the viscosity torque coefficient C due to the liquid 7 in the tank 2. By this, the damping torque $T_Z = \mu \xi$ can be obtained. For example, if the value of the viscosity torque coefficient C due to the liquid 7 in the tank 2 is large, the time constant TF of the first-order lag filter should be large, while if the value of the viscosity torque coefficient C is small, the time constant TF of the first-order lag filter should be small.

According to the present example, by selecting a large value as the time constant $T_F$ of the first-order lag filter, a high viscosity damping liquid can be used as a liquid 7 in the tank 2. Therefore, the gyro case 1 can be prevented from coming into collision with the inner surface of the tank 2 on acceleration or deceleration, or rotation of a high speed ship.

When the tank 2 is rotated about a vertical axis at a twisting angle $\psi$, the rotational angular velocity $d\psi/dt$ is small in case that the time constant $T_F$ of the first-order lag filter is large. The viscosity torque of the first term of equation 6 is proportional to the viscosity of liquid 7 and the rotational angular velocity $d\psi/dt$. Accordingly, though the viscosity of liquid 7 is large, the viscosity torque is small as long as the rotational angular velocity $d\psi/dt$ is small, and therefore a suitable damping torque can be obtained.

Figure 6:
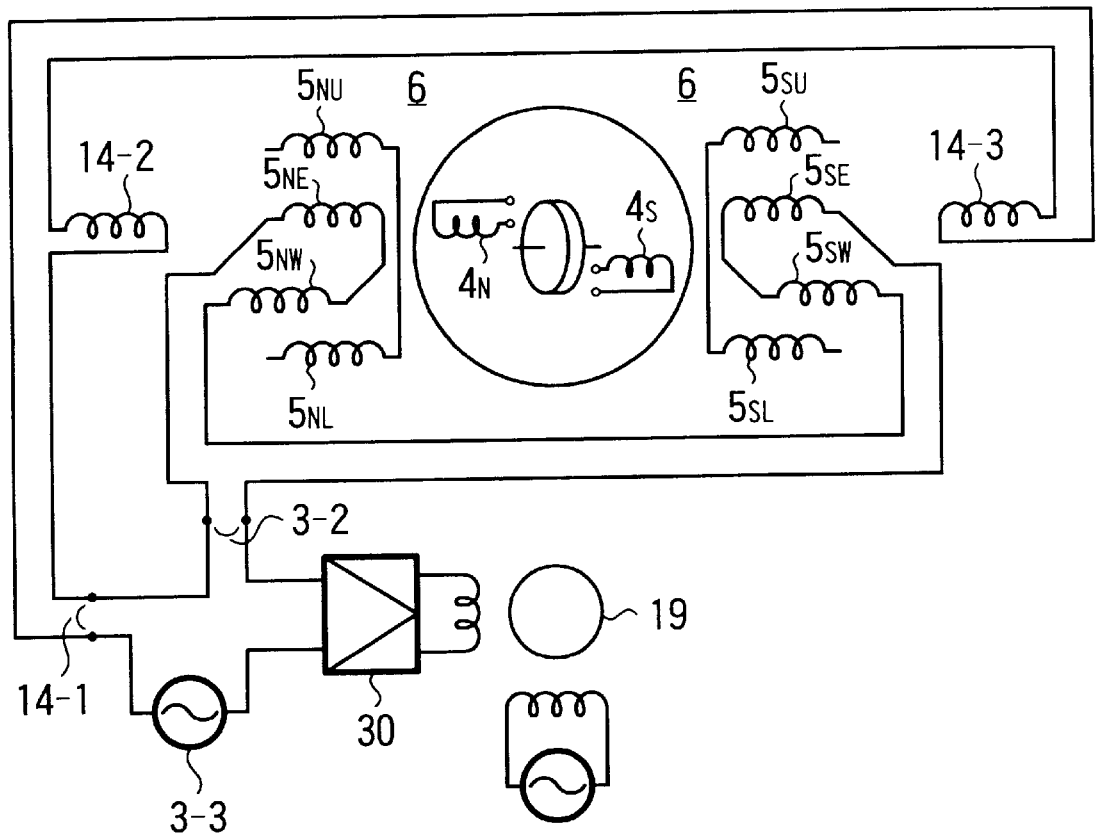
FIG. 6 is a diagram showing an example of the composition of the damping means of a prior art gyro compass.
Figure 7A:
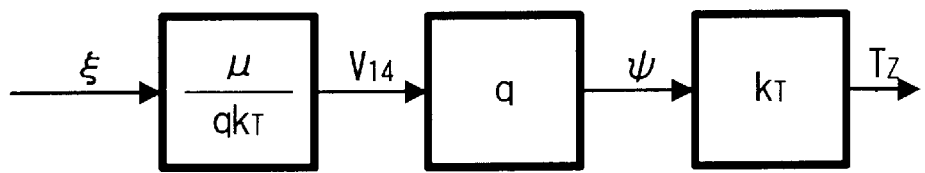
FIG. 7A is a block diagram of a damping system of a prior art gyro compass.
Figure 7B:
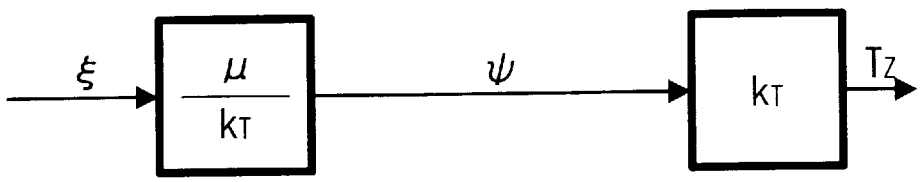
FIG. 7B is a block diagram that two blocks in FIG. 7A is combined to one block.
Figure 7C:
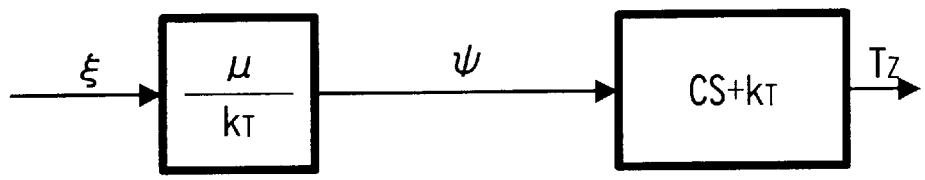
FIG. 7C is a block diagram that the viscosity of the liquid in the tank is taken into consideration.
Figure 7D:
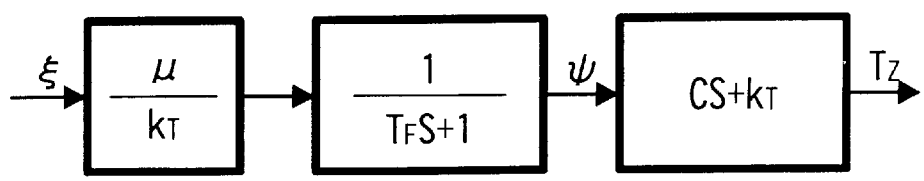
FIG. 7D is a block diagram that a first-order lag filter of a time constant $T_F$ is inserted.
Figure 8A:
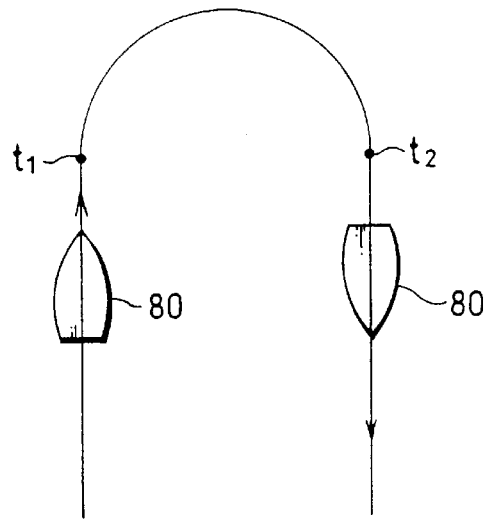
FIG. 8A shows a navigation track on which a ship heading northward has turned round clockwise at 180°.
Figure 8B:
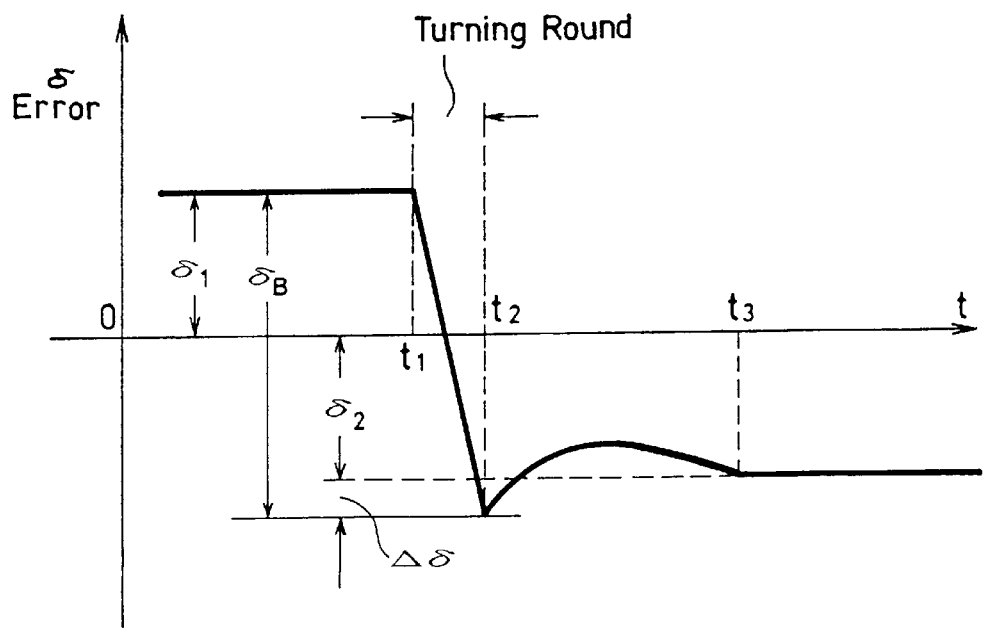
FIG. 8B shows changes of the error δ in the azimuth $\phi_M$ of ship's head indicated by gyro compass.

The first-order lag filter is positioned at any suitable point on the input side of the azimuth servo motor 19 in the control loop of the damping system shown in FIG. 6. If an azimuth servo amplifier 30 is provided, it may be positioned in the azimuth servo amplifier 30.

Figures 11A, 11B, 11C:
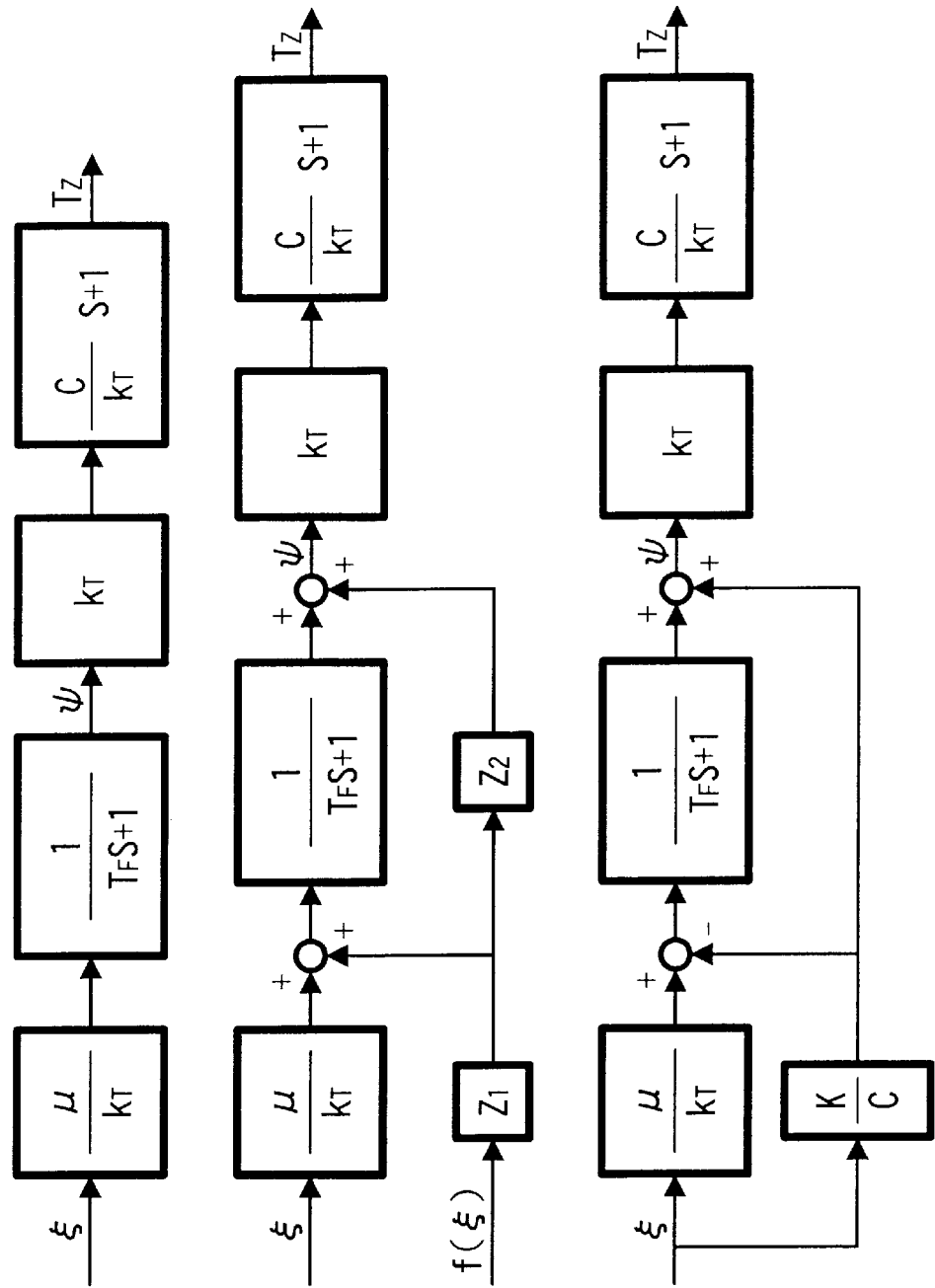
FIG. 11A is a block diagram of a damping system of the gyro compass according to the present invention in which a substantially first-order lag filter is inserted.
FIG. 11B is a block diagram of a damping system of the gyro compass according to the present invention including two transfer functions.
FIG. 11C is a block diagram of another example of damping system of the gyro compass according to the present invention.

Referring to FIG. 11B, a second example of the present invention is described. The input of the control loop of the damping system according to the present embodiment is the displacement $\xi$ of gyro case 1 and a function $f(\xi)$ of the displacement $\xi$. The function $f(\xi)$ to which a first transfer function $z_1$ has been multiplied is added to the input of the first-order lag filter. The function $f(\xi)$ to which a first and a second transfer functions $z_1, z_2$ have been multiplied is added to the output of the first-order lag filter.

Accordingly, a damping torque $\mu \xi$ corresponding to the displacement $\xi$ of gyro case 1 and additionally an additional torque $T_E$ are applied to the gyro case 1.

$$T_Z = \mu \xi + T_E \qquad \text{[EQUATION 17]}$$

By selecting the first and second transfer functions $z_1, z_2$ appropriately, a desired additional torque TE can be obtained. For example, an additional torque for correcting speed error, ballistic error or the like can be obtained. Two examples of the additional torque $T_E$ is described hereinafter.

(1) If the additional torque $T_E$ is equal to $f(\xi)$, the output torque $T_Z$ is expressed by the following equation.

$$T_Z = \mu \xi + f(\xi) \qquad \text{[EQUATION 18]}$$

This output torque includes a function $f(\xi)$ as an additional torque TE besides the damping torque $\mu \xi$. This corresponds to a case that the first transfer function is $z_1 = 1$, and the second transfer function is $z_2 = 0$. This additional torque $f(\xi)$ may be a torque for correcting speed error, ballistic error or the like.

(2) If the additional torque TE is equal to $Ks\xi$, the output torque $T_Z$ is expressed by the following equation.

$$T_Z = \mu \xi + Ks\xi = (\mu + Ks)\xi \qquad \text{[EQUATION 19]}$$

In the equation, K is a constant and s is Laplace's operator. This output torque $T_Z$ includes a torque $Ks\xi$ proportional to the movement speed of the gyro case 1 as an additional torque TE besides the damping torque $\mu \xi$. This corresponds to a case that the first transfer function is $z_1 = -K/C$, the second transfer function is $z_2 = 1$ and the function $f(\xi)$ is $\xi$, as shown in FIG. 11C. The additional tea torque $Ks\xi$ may be a torque for correcting ballistic error.

In case of this example, the input of control loop of the damping system is the displacement $\xi$ of the gyro case 1 and a function $f(\xi)$ of the displacement $\xi$. These can be obtained only by using the output voltage $V_{14}$ from the output terminal 14-1 of the displacement detecting coils 14-2,14-3. In other words, according to the present example, not only the damping torque $\mu \xi$ but also a desired additional torque $T_E$ can be obtained by using the output voltage $V_{14}$ of the displacement detecting coils 14-2,14-3. In this way, according to the present example, a large speed error, ballistic error or the like can be corrected by providing control blocks as shown in FIG. 11B and FIG. 11C and by utilizing a prior art apparatus without providing any vertical torquer or the like.

In the meanwhile, the example shown in FIG. 11A corresponds to a case that the first transfer function is $z_1 = 0$ and the second transfer function is $z_2 = 0$ in the example shown in FIG. 11B. Therefore, the block diagram shown in FIG. 11B represents a generalized example of the present invention. If the first transfer function is $z_1 = 0$ and the second transfer function is $z_2 = 0$, only a damping torque $\mu \xi$ is applied to the gyro case 1, but, if any values and/or functions, both of which are not zero, are selected as first and second transfer functions, a desired additional torque can be produced for eliminating speed error, ballistic error or the like.

According to the above described examples, a first-order lag filter is provided in the azimuth follow-up loop or the damping loop, however, any lag filter, for example, a second-order lag filter, may be provided if it acts as substantially a first-order lag filter.

Figure 5:
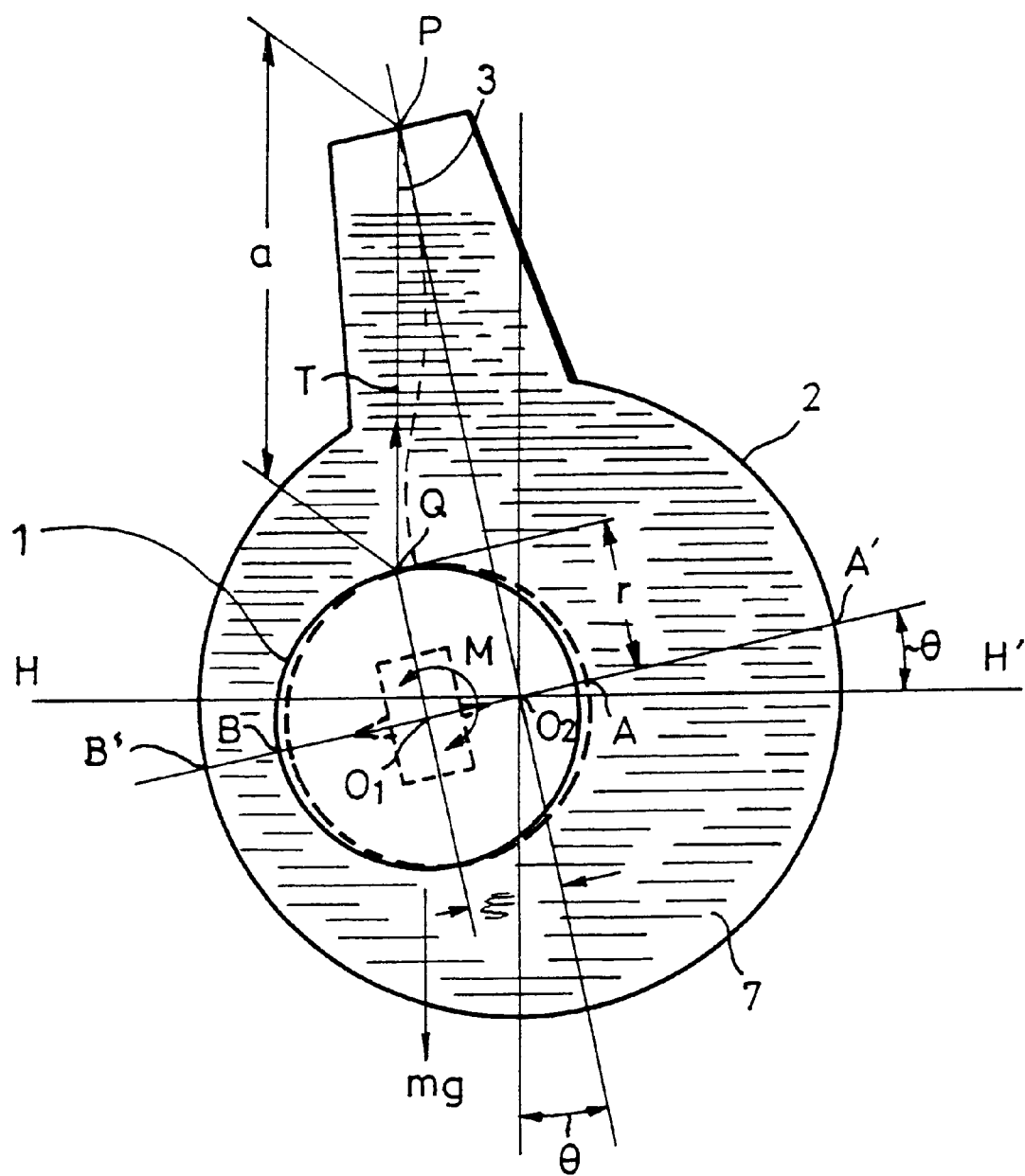
FIG. 5 is a diagram showing an example of the composition of the north-seeking means of a prior art gyro compass.

Referring to FIG. 12, another example of gyro compass according to the present invention is described. FIG. 12 is a block diagram of an error correction part of a gyro compass of the present invention. In the meanwhile, the main body of gyro compass may be the same as that of the prior art gyro compass as described with reference to FIG. 1 and FIG. 5. However, in the present invention, the viscosity of liquid 7 stored in tank 2 of the north-seeking apparatus shown in FIG. 5 is higher than that of the prior art apparatus.

The gyro compass is a master compass and therefore the output of the gyro compass is supplied to a repeater compass. The repeater compass indicates the outputs of the error correction part.

The error correction part according to the present example comprises a speed error calculating part 36, a time lag calculating part 37 and an azimuth correction part 38. The speed error calculating part 36 is applied to calculate the speed error correction angle $\delta_V$ by substituting a velocity V, a latitude $\lambda$, and an azimuth angle C into the equation 7. The azimuth angle C may be an azimuth angle $\phi_M$ supplied from the master compass. Namely, the azimuth angle C may be supplied from the azimuth indicator 35 mounted on the master compass.

The azimuth angle $\phi_M$ supplied from the master compass, which has not yet been corrected, includes errors and therefore the speed error correction angle $\delta_V$ obtained by the equation 7 is not accurate. However, its error is small enough to be neglected.

The output of the speed error calculating part 36 is supplied to the time lag calculating part 37. The time lag calculating part 37 is substantially a first-order lag filter and is applied to output the speed error correction angle $\delta_V$ with a time lag corresponding to its time constant $T_P$. As a time constant $T_P$, a value close to the time constant $T_G$ of the north-seeking apparatus may be selected, but the method for determining it will be described in detail later.

If the output of the speed error calculating part 36 is digital, the time lag calculating part 37 may be composed by a suitable software. If the output of the speed error calculating part 36 is analog, the time lag calculating part 37 may be composed by a suitable operation amplifier or a circuit including an OP amplifier.

The output of the time lag calculating part 37 is supplied to the azimuth correction part 38, by which the azimuth angle $\phi_M$ supplied from the master compass is corrected. According to the present example, the azimuth angle $\phi_M$ indicated by the master compass has been corrected by the speed error correction angle $\delta_V$ not at the same time but at the time after a delay time corresponding to the time constant $T_P$.

The azimuth correction part 38 outputs as an output of gyro compass this azimuth angle which has been corrected by the speed error correction angle $\delta_V$. If the gyro compass is a master compass which is connected to a repeater compass, the output of the azimuth correction part 38 is supplied to the repeater compass 40 which indicates this azimuth angle $\delta_R$ from which errors have been eliminated.

The azimuth correction part 38 has a function of error correction and error calculation and at the same time a function of signal transformation. For example, it can transform the speed error correction angle $\delta_V$ outputted from the time lag calculating part 37 into a signal which is able to be added to the output of the azimuth indicator 35 of the master compass. Further, if the repeater compass 40 is so composed that a card is rotated by a step-motor to indicate the azimuth angle $\delta_R$, the azimuth correction part 38 is so composed to have a function of a transformer for outputting step-like signals.

Figure 9A:
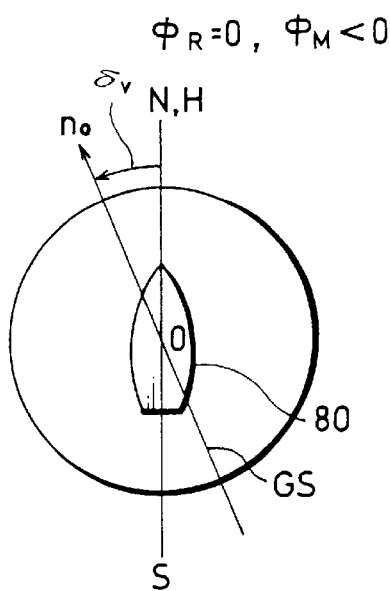
FIG. 9A–FIG. 9D are diagrams for illustrating an error correcting method of gyro compass according to a prior art gyro compass.
Figure 9B:
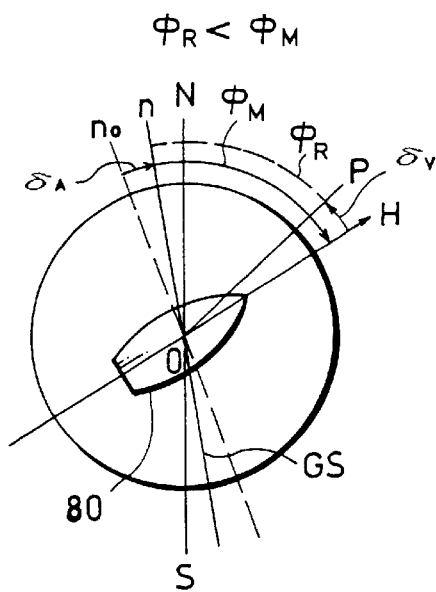
Figure 9C:
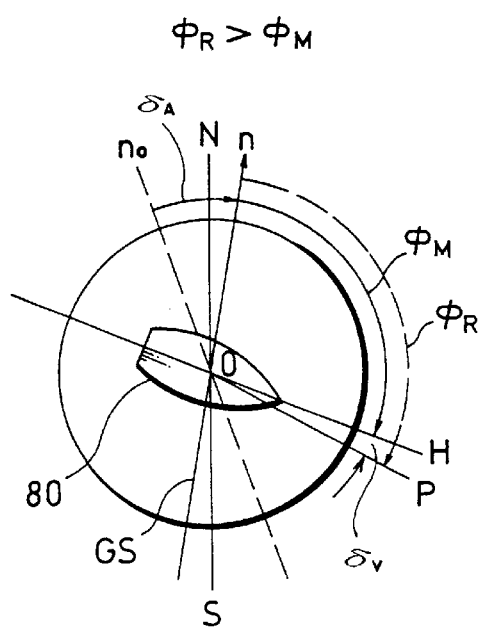
Figure 10A:
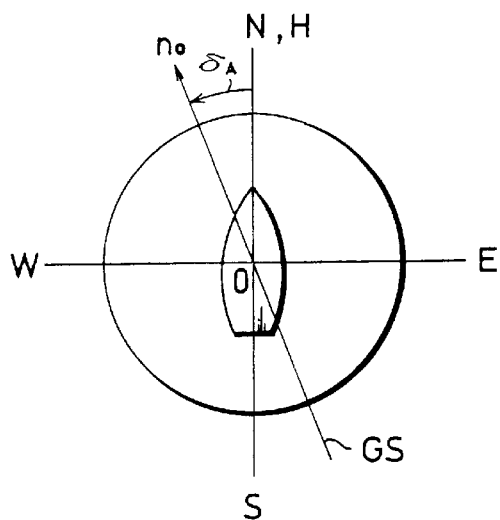
FIG. 10A–FIG. 10D are diagrams for illustrating a principle to generate errors of gyro compass in a high speed ship.
Figure 13A:
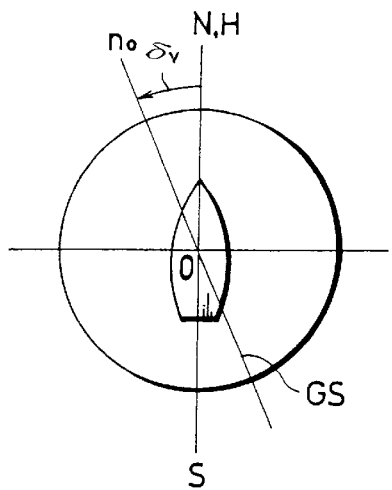
FIG. 13A–FIG. 13E are diagrams for illustrating an error correcting method of gyro compass according to the present invention.

Referring to FIG. 13A–FIG. 13E, the function of error correction apparatus according to the present invention is described. FIG. 13A shows a ship heading northward at a constant speed and the azimuth of master compass or the spin axis GS of gyro rotor. It is the same as FIG. 9A and FIG. 10A and the detail description is omitted.

Figure 10B:
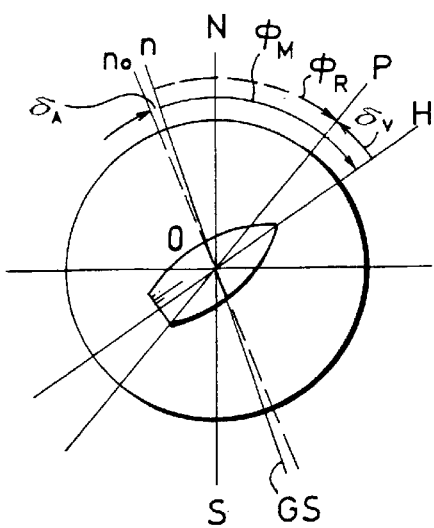
Figure 13B:
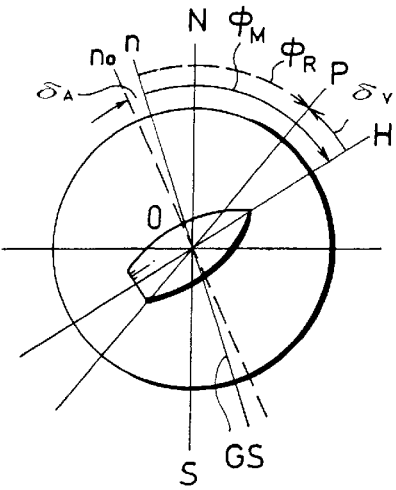

FIG. 13B shows that the ship has begun to turn round clockwise and the azimuth OH of the ship's head is in first quadrant of plane coordinate. The magnitude of ballistic error $\delta_A = \angle n_oOn$ is the same as that of FIG. 10B. Accordingly, the magnitude of azimuth angle M=$\angle$nOH indicated by master compass is also the same as that of FIG. 10B. However, the speed error correction angle $\delta_V = \angle$POH is greater than that of FIG. 10B. This is because the speed error correction angle $\delta_V$ calculated by the speed error calculating part 36 in FIG. 12 is outputted through the time lag calculating part 37, and therefore it is approximately equal to the value before the turning round. Accordingly, the azimuth angle $\phi_R = \angle$nOP indicated by repeater compass 40 is smaller than that of FIG. 10B.

Figure 10C:
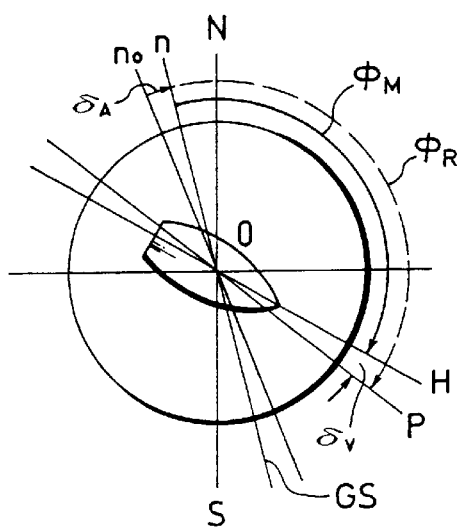
Figure 10D:
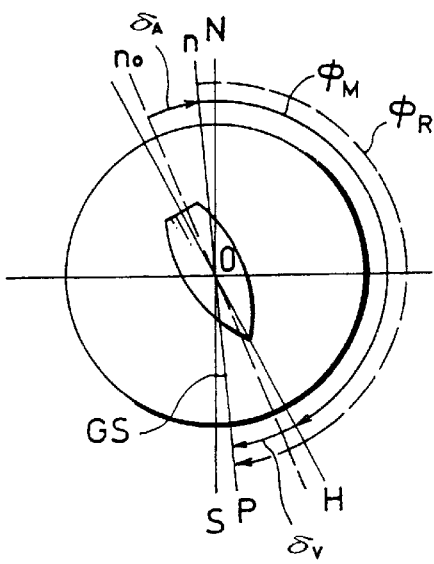
Figure 13C:
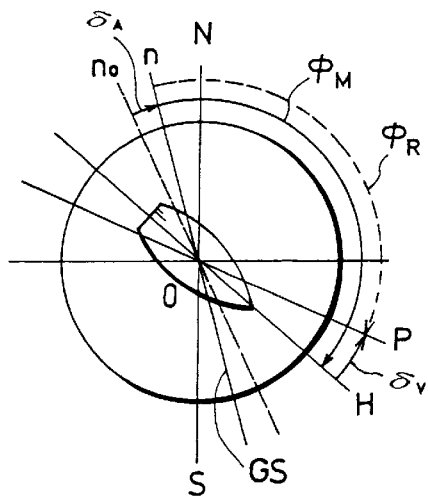

FIG. 13C shows that the ship has turned round clockwise further and the azimuth OH of the ship's head is in the second quadrant. The magnitude of ballistic error $\delta_A = \angle n_oOn$ is the same as that of FIG. 10C. Accordingly, the magnitude of azimuth angle $\phi_M = \angle$nOH indicated by master compass is also the same as that of FIG. 10C. However, the speed error correction angle $\delta_V$ is different from that of FIG. 10C. In case of FIG. 10C, the sign of speed error correction angle $\delta_V$ is negative, but in case of FIG. 13C, the sign of speed error correction angle $\delta_V$ is still positive. Accordingly, the azimuth angle $\phi_R = \angle$nOP indicated by repeater compass 40 is smaller than the azimuth angle $\phi_M = \angle$nOH by master compass and smaller than that of FIG. 10C.

Figure 13D:
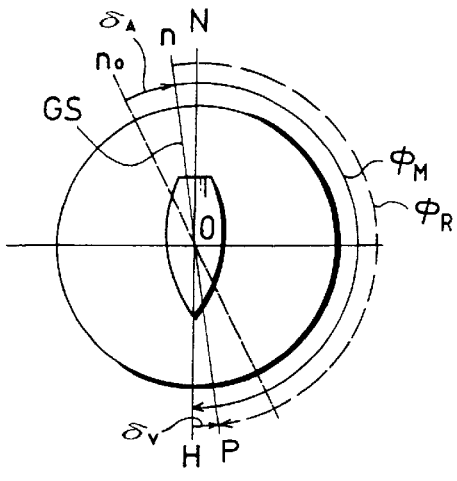

FIG. 13D shows that the ship has turned round clockwise further and the azimuth angle $\phi_R = \angle$nOP indicated by repeater compass 40 is close to 180°. The sign of speed error correction angle $\delta_V$ is still positive, and the azimuth angle $\phi_R = \angle$nOP indicated by repeater compass 40 is smaller than the azimuth angle $\phi_M = \angle$nOH by master compass. If the following relation is given at this moment, the azimuth OH of the ship's head is pointing to the due south OS.

$\angle$nON=$\angle$POH    [EQUATION 20]

This means that the azimuth angle $\angle$nON of the spin axis GS of gyro is equal to the speed error correction angle $\delta_V$.

Figure 9D:
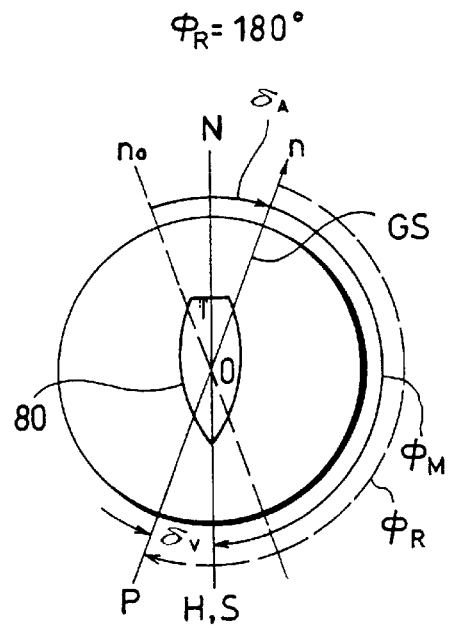
Figure 13E:
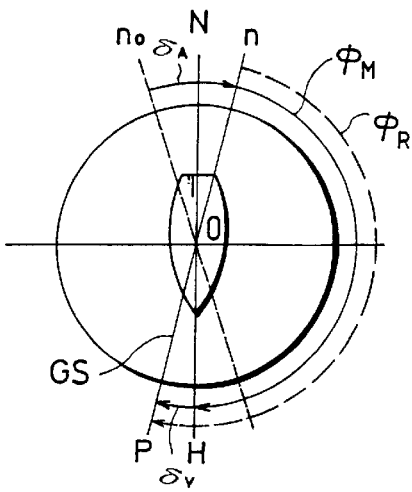

FIG. 13D shows that the ship has finished the turning round and is running straight southward at a constant speed. At this moment, the north-south acceleration $\alpha$ applied to gyro case 1 is zero, but the gyro case 1 has not yet returned to the center point of the tank 2. Accordingly, there exists a torque due to the inclination of gyro case 1 and the magnitude of ballistic error $\delta_A = \angle n_oOn$ as increases. However, the speed error correction angle $\delta_V$ changes in sign from positive to negative, the azimuth angle $\phi_R = \angle$nOP indicated by repeater compass 40 becomes greater than the azimuth angle $\phi_M = \angle$nOH by master compass. Finally, as shown in FIG. 13E, it becomes the same as that of FIG. 9D. The azimuth angle $\phi_R = \angle$nOP indicated by repeater compass 40 becomes 180°.

A method for determining the filter's time constant $T_P$ is described. The filter's time constant $T_P$ is determined in order that the equation 20 hold true during, before and after the turning round of a ship. In case of FIG. 9, the equation 20 does not hold true, but according to the present example, the equation 20 holds true during, before and after the turning round of a ship. The filter's time constant $T_P$ is determined so as to be, for example, equal to or approximately equal to the time constant $T_G$ of the north-south motion of gyro case 1.

As described above, the ballistic error $\delta_A$ is produced by the inclination of gyro case 1. Accordingly, the ballistic error $\delta_A$ is produced by the north-south acceleration $\alpha$ applied to the gyro case 1 when a ship is turning round, however, although the ship has finished the turning round and the north-south acceleration $\alpha$ became zero, it still exists until the gyro case 1 returns to the center point of the tank 2. On the other hand, strictly speaking, the equation of precession motion is different between when the north-south acceleration exists and when it does not exist, and in therefore, the change of the ballistic error $\delta_A$ is different.

On the contrary, the correction by the speed error correction angle $\delta_V$ is a continuous operation, and both are not coincide with each other. However, according to the research by the inventors of the present invention, by setting the filter's time constant TP to be equal to or approximately equal to the time constant $T_G$ Of the north-south motion of gyro case 1, it is possible to make the azimuth angle of the spin axis GS of gyro substantially equal to the speed error correction angle $\delta_V$.

In the above described examples, a first-order lag filter is used as a time lag calculating part 37, however, any lag filter for example a second-order lag filter, may be used as long as it acts as substantially a first-order lag filter.

The present invention has been described with reference to an example of gyro compass of the type having a gyro sphere type north-seeking apparatus, however, the present invention can be adopted in any type of gyro compass having a north-seeking apparatus which generates a similar ballistic error.

At present, Anschutz-type gyro compass which was successfully put into practical use in 1908 for the first time, Sperry-type gyro compass which was successfully put into practical use in 1911, and four to five other types of gyro compass have been brought into practical use in the world. However, all the gyro compasses for commercial use are designed so as to be used at a speed range below 30 Knots, and no gyro compass for the use of high speed ships at 70 Knots or more has been successfully brought into practical use.

According to the present invention, a gyro compass which can be used in a high speed ship running at 70 Knots or more can be realized and it will be good news for every crew in the world.

Examples of the present invention have been described in detail above. However, it can be understood that the present invention is not limited by these examples and many modification and alterations can be made within the scope of the present invention.

According to the present invention, since a high viscosity liquid can be used as a liquid in the tank in a high speed ship by setting the time constant of the first-order or second-order lag filter to a predetermined value, an advantage can be obtained that the gyro case can not come into collision with the inner surface of the tank on acceleration or deceleration, or rotation of a ship.

According to the present invention, in a high speed ship, an advantage can be obtained that speed error, ballistic error or the like can be corrected by utilizing a composition of a prior art gyro compass without providing any vertical torquer or the like.

According to the present invention, an advantage can be obtained that a torque about a vertical axis for correcting speed error, ballistic error or the like can be applied to the gyro case only by setting the time constant of the first-order or second-order lag filter to a predetermined value.

According to the present invention, it is advantageously possible to provide a gyro compass which can be used in a high speed ship running at 70 Knots or more.

According to the present invention, it is advantageously possible to provide a gyro compass which can be used in a high speed ship running at 70 Knots or more only by adding a simple apparatus to a prior art gyro compass.

According to the present invention, it is advantageously possible to provide a gyro compass which can be used in a high speed ship running at 70 Knots or more only by increasing the time constant of substantially first-order lag element in a gyro compass having a north-seeking apparatus having a first-order or second-order lag element and adding an operating device including a first-order or second-order lag filter corresponding to the first-order or second-order lag element.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claim is:

1. A gyrocompass comprising;

a gyro case containing therein a gyro rotor having an approximately horizontal spin axis, a container for surrounding said gyro case and for accommodating liquid therein, first supporting means for supporting said gyro case within said container, second supporting means for supporting said container with a freedom of three axes, an azimuth follow-up loop for causing said container to follow said gyro case about a vertical axis, a damping loop for applying a torque proportional to inclination angle of said spin axis of gyro rotor relative to a horizontal plane to said gyro case about a vertical axis, and a substantially first-order lag filter being provided in said azimuth follow-up loop or said damping loop, said substantially first-order lag filter having a time constant $T_F$ which is approximately equal to a ratio $C/k_T$ of the viscosity torque coefficient C to the twisting torque coefficient $k_T$ of the torque produced between said container and said gyro case.

2. The gyro compass as claimed in claim 1 further comprising;

error correction signal generating means for generating an error correction signal being provided in said azimuth follow-up system or said damping system, a signal which can be obtained by multiplying a first transfer function to the output signal of said error correction signal generating means being supplied to said substantially first-order lag filter, and a signal which can be obtained by multiplying a second transfer function to said signal obtained by multiplying said first transfer function being added to said output of said substantially first-order lag filter, thereby to produce a desired change in the output of said substantially first-order lag filter so that said container can rotate about a vertical axis relative to said gyro case.

3. The gyro compass as claimed in claim 2 wherein said first transfer function is a constant value of 1 and said second transfer function is a constant value of 0.

4. The gyro compass as claimed in claim 2 wherein said first transfer function is a constant value with a negative sign and said second transfer function is a constant value of 1.

5. The gyro compass as claimed in claim 2 wherein said damping loop has a displacement detecting pick-up for detecting a displacement of said gyro case relative to said container, and said error correction signal generating means is connected to output terminal of said displacement detecting pick-up.

6. A gyrocompass comprising;

a gyro case containing therein a gyro rotor having an approximately horizontal spin axis, supporting means for supporting said gyro case with a freedom of three axes, north-seeking means for applying a torque to said gyro case about a horizontal axis perpendicular to said spin axis, said torque being proportional to an inclination angle of said spin axis relative to a horizontal plane and time lagged by a predetermined time constant, an azimuth indicator for indicating the azimuth angle of vehicle head relative to said spin axis, speed error correcting means for calculating a speed error correcting angle from the output of said azimuth indicator, speed and latitude of vehicle and for correcting said output of azimuth indicator by said speed error correcting angle, said speed error correcting means having a substantially first-order lag filter having a time constant which is approximately equal to that of said north-seeking means, and said speed error correcting means being applied to correct said output of said azimuth indicator by said speed error correcting angle through said substantially first-order lag filter.

7. The gyro compass as claimed in claim 6 wherein said time constant of said substantially first-order lag filter is determined so that said speed error correcting angle is substantially equal to the angle between said spin axis and the meridian during acceleration or deceleration, or turning of vehicle.

* * * * *